United States Patent
Nakai et al.

(10) Patent No.: US 12,526,597 B2
(45) Date of Patent: Jan. 13, 2026

(54) REPRODUCING DEVICE, REPRODUCING METHOD, INFORMATION PROCESSING DEVICE, INFORMATION PROCESSING METHOD, AND PROGRAM

(71) Applicant: Sony Group Corporation, Tokyo (JP)

(72) Inventors: Akihito Nakai, Shizuoka (JP); Asako Tomura, Tokyo (JP); Taiki Endo, Tokyo (JP); Masahiko Koizumi, Tokyo (JP); Chihiro Sugai, Tokyo (JP)

(73) Assignee: Sony Group Corporation, Tokyo (JP)

( * ) Notice: Subject to any disclaimer, the term of this patent is extended or adjusted under 35 U.S.C. 154(b) by 240 days.

(21) Appl. No.: 18/265,007

(22) PCT Filed: Nov. 25, 2021

(86) PCT No.: PCT/JP2021/043098
§ 371 (c)(1),
(2) Date: Jun. 2, 2023

(87) PCT Pub. No.: WO2022/124084
PCT Pub. Date: Jun. 16, 2022

(65) Prior Publication Data
US 2023/0421981 A1    Dec. 28, 2023

(30) Foreign Application Priority Data
Dec. 9, 2020  (JP) ................. 2020-204354

(51) Int. Cl.
*H04S 7/00*  (2006.01)
(52) U.S. Cl.
CPC .......... *H04S 7/302* (2013.01); *H04S 2420/01* (2013.01)

(58) Field of Classification Search
None
See application file for complete search history.

(56) References Cited

U.S. PATENT DOCUMENTS 9,544,706 B1 *   1/2017  Hirst .................. H04S 7/00
10,469,975 B2 *  11/2019  Edry .................. H04S 7/303
(Continued)

FOREIGN PATENT DOCUMENTS

JP  2009-260574 A  11/2009
JP  2015-130550 A   7/2015
(Continued)

OTHER PUBLICATIONS

International Written Opinion and English translation thereof mailed Mar. 1, 2022 in connection with International Application No. PCT/JP2021/043098.
(Continued)

*Primary Examiner* — Qin Zhu
(74) *Attorney, Agent, or Firm* — Wolf, Greenfield & Sacks, P.C.

(57) ABSTRACT

The present technique relates to a reproducing device, a reproducing method, an information processing device, an information processing method, and a program, by which realistic contents can be provided while reducing a load of processing.
A reproducing device according to a first aspect of the present technique includes a reproducing unit configured to reproduce object audio contents including a first object reproduced by using a personalized HRTF that is an HRTF personalized for a listener, and a second object reproduced by using a common HRTF that is an HRTF shared among a plurality of listeners. The present technique is applicable to a device that reproduces contents including audio data.

17 Claims, 29 Drawing Sheets

(56) References Cited

U.S. PATENT DOCUMENTS

| | | | |
|---|---|---|---|
| 2017/0272890 A1* | 9/2017 | Oh | H04S 7/304 |
| 2023/0283976 A1* | 9/2023 | Ninan | H04S 7/304 |
| | | | 381/303 |
| 2024/0015460 A1* | 1/2024 | Yoshida | H04S 7/301 |

FOREIGN PATENT DOCUMENTS

| | | |
|---|---|---|
| JP | 2018-010654 A | 1/2018 |
| JP | 2020-170938 A | 10/2020 |
| JP | 2020174346 A | 10/2020 |
| WO | WO-2015017914 A1 | 2/2015 |

OTHER PUBLICATIONS

International Preliminary Report on Patentability and English translation thereof mailed Jun. 22, 2023 in connection with International Application No. PCT/JP2021/043098.
Extended European Search Report issued Apr. 10, 2024 in connection with European Application No. 21903188.7.
Yu Guangzhang et al: "Effect of Individualized Head-Related Transfer Functions on Distance Perception in Virtual Reproduction for a Nearby Source", Conference: 2018 Aes International Conference on Spatial Reproduction—Aesthetics and Science; Jul. 2018, AES, 60 East 42nd Street, Room 2520 New York 10165-2520,USA, Jul. 30, 2018 (Jul. 30, 2018), XP040698956.
International Search Report and English translation thereof mailed Mar. 1, 2022 in connection with International Application No. PCT/JP2021/043098.

* cited by examiner

REPRODUCING DEVICE, REPRODUCING METHOD, INFORMATION PROCESSING DEVICE, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/043098, filed in the Japanese Patent Office as a Receiving Office on Nov. 25, 2021, which claims priority to Japanese Patent Application Number JP2020-204354, filed in the Japanese Patent Office on Dec. 9, 2020, each of which is hereby incorporated by reference in its entirety.

TECHNICAL FIELD

The present technique particularly relates to a reproducing device, a reproducing method, an information processing device, an information processing method, and a program, by which realistic contents can be provided while reducing a load of processing.

BACKGROUND ART

So-called audiobooks are provided as contents including recorded voice narrations of books by narrators and voice talents. For example, a user listens to audiobook sound, which is reproduced by a smartphone, through headphones. This provides a sense of reading books without following printed text with eyes.

CITATION LIST

Patent Literature

PTL 1

JP 2018-010654 A

PTL 2

JP 2009-260574 A

SUMMARY

Technical Problem

In a scene where a plurality of characters appear, it is difficult to impart the realism only by a voice narration of a book.

Realism may be imparted by reproducing, for example, the direction, distance, and a movement of a voice with a head-related transfer function (HRTF). Through an operation using an HRTF that mathematically expresses how a sound travels from a sound source to ears, a sound from headphones can be stereoscopically reproduced.

Since HRTFs vary among the shapes of ears, precise localization of a sound image requires the personalization of an HRTF for each user. Using personalized HRTFs for all sounds causes a large load of processing on the production side and the reproduction side of contents.

The present technique has been made in view of such a situation and provides realistic contents while reducing a load of processing.

Solution to Problem

A reproducing device according to a first aspect of the present technique includes a reproducing unit configured to reproduce object audio contents including a first object reproduced by using a personalized HRTF that is an HRTF personalized for a listener, and a second object reproduced by using a common HRTF that is an HRTF shared among a plurality of listeners.

An information processing device according to a second aspect of the present technique includes: a metadata generation unit configured to generate metadata including a flag indicating whether an object is to be reproduced as a first object reproduced by using a personalized HRTF that is an HRTF personalized for a listener or a second object reproduced by using a common HRTF that is an HRTF shared among a plurality of listeners, and a content generation unit configured to generate object audio contents including sound source data on a plurality of objects and the metadata.

An information processing device according to a third aspect of the present technique includes: a content acquisition unit configured to acquire object audio contents including sound source data on a plurality of objects and metadata including a flag indicating whether the object is to be reproduced as a first object reproduced by using a personalized HRTF that is an HRTF personalized for a listener or a second object reproduced by using a common HRTF that is an HRTF shared among a plurality of listeners; an audio processing unit configured to perform processing using the common HRTF on audio data on the object selected to be reproduced as the second object on the basis of the flag; and a transmission data generation unit configured to generate transmission data on the contents including channel-base data generated by the processing using the common HRTF and audio data on the first object.

In the first aspect of the present technique, object audio contents are reproduced, the object audio contents including the first object reproduced by using the personalized HRTF that is an HRTF personalized for a listener, and the second object reproduced by using the common HRTF that is an HRTF shared among a plurality of listeners.

In the second aspect of the present technique, metadata is generated, the metadata including the flag indicating whether an object is to be reproduced as the first object reproduced by using the personalized HRTF that is an HRTF personalized for a listener or the second object reproduced by using the common HRTF that is an HRTF shared among a plurality of listeners, and object audio contents including sound source data on a plurality of objects and the metadata is generated.

In the third aspect of the present technique, object audio contents are acquired, the object audio contents including sound source data on a plurality of objects and metadata including the flag indicating whether the object is to be reproduced as the first object reproduced by using the personalized HRTF that is an HRTF personalized for a listener or the second object reproduced by using the common HRTF that is an HRTF shared among a plurality of listeners. Moreover, processing using the common HRTF is performed on audio data on the object selected to be reproduced as the second object on the basis of the flag, and transmission data on the contents is generated, transmission data including channel-base data generated by the processing using the common HRTF and audio data on the first object.

DESCRIPTION OF EMBODIMENT

An embodiment for implementing the present technique will be described below. The description will be made in the following order.

1. Contents distribution system
2. Principle of sound image localization using HRTF
3. Detail of audiobook contents
4. Configuration of each device
5. Operation of each device
6. Modifications
7. Other examples <<Contents Distribution System>>

Figure 1:
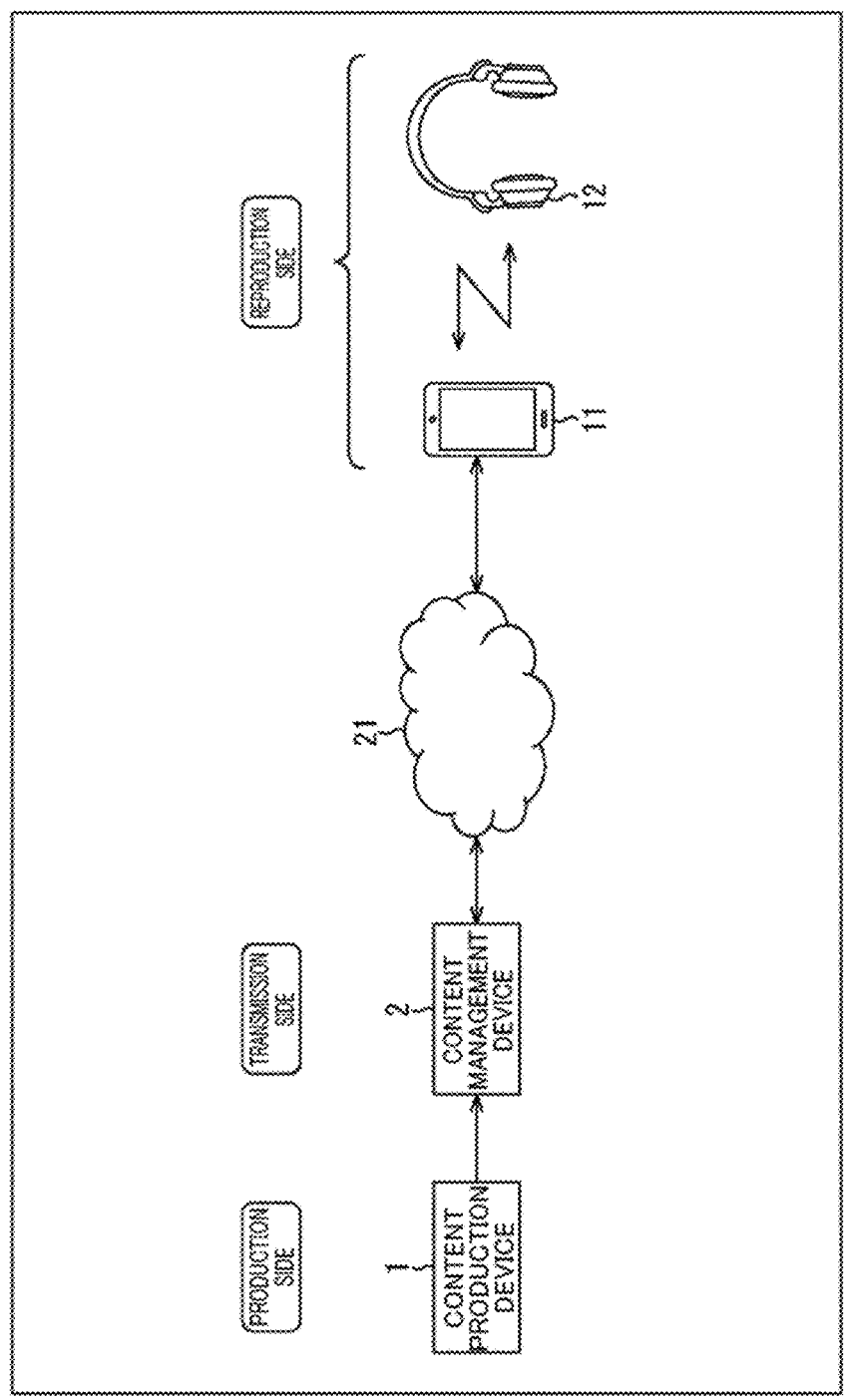
FIG. 1 illustrates a configuration example of a contents distribution system according to an embodiment of the present technique.

FIG. 1 illustrates a configuration example of a contents distribution system according to an embodiment of the present technique.

The contents distribution system in FIG. 1 includes a content production device 1 that is a device of the content production side, a content management device 2 that is a device of the content transmission side, and a reproducing device 11 that is a device of the content reproduction side. Headphones 12 are connected to the reproducing device 11.

The content management device 2 and the reproducing device 11 are connected to each other via a network 21, e.g., the Internet. The content production device 1 and the content management device 2 may be connected to each other via the network 21.

Contents distributed in the contents distribution system in FIG. 1 are the contents of so-called audiobooks in which voice narrations of books are recorded. Audiobook contents include various kinds of sounds such as a sound effect, an ambient sound, and BGM as well as human voices of narrations and lines. Hereinafter, the sound of audiobook contents will be simply described as a voice as appropriate unless the kind of sound needs to be identified. In reality, the sound of audiobook contents includes kinds of sound other than a voice.

The content production device 1 generates audiobook contents in response to an operation of a producer. The audiobook contents generated by the content production device 1 are supplied to the content management device 2.

The content management device 2 generates transmission data, which is data for contents transmission, on the basis of the audiobook contents generated by the content production device 1. In the content management device 2, for example, a plurality of transmission data pieces having different data volumes are generated for each title of audiobook contents. The content management device 2 transmits transmission data having a predetermined data volume to the reproducing device 11 in response to a request from the reproducing device 11.

The reproducing device 11 is configured with a device like a smartphone. The reproducing device 11 may be configured with other devices such as a tablet, a PC, and a TV. The reproducing device 11 receives audiobook contents transmitted from the content management device 2 via the network 21 and reproduces the contents. The reproducing device 11 transmits audio data, which is obtained by reproducing the audiobook contents, to the headphones 12 and causes the headphones 12 to output the voice of the audiobook contents.

The reproducing device 11 and the headphones 12 are wirelessly connected to each other via a wireless LAN or communications of a predetermined standard, for example, Bluetooth (registered trademark). The reproducing device 11 and the headphones 12 may have a wired connection. In the example of FIG. 1, a device used for listening to audiobook contents by a user is the headphones 12. Other devices such as a speaker and earphones (inner ear headphones) may be used instead.

The reproducing device 11 and the headphones 12 as devices on the reproduction side are prepared for each user, a listener of audiobook contents.

Figure 2:
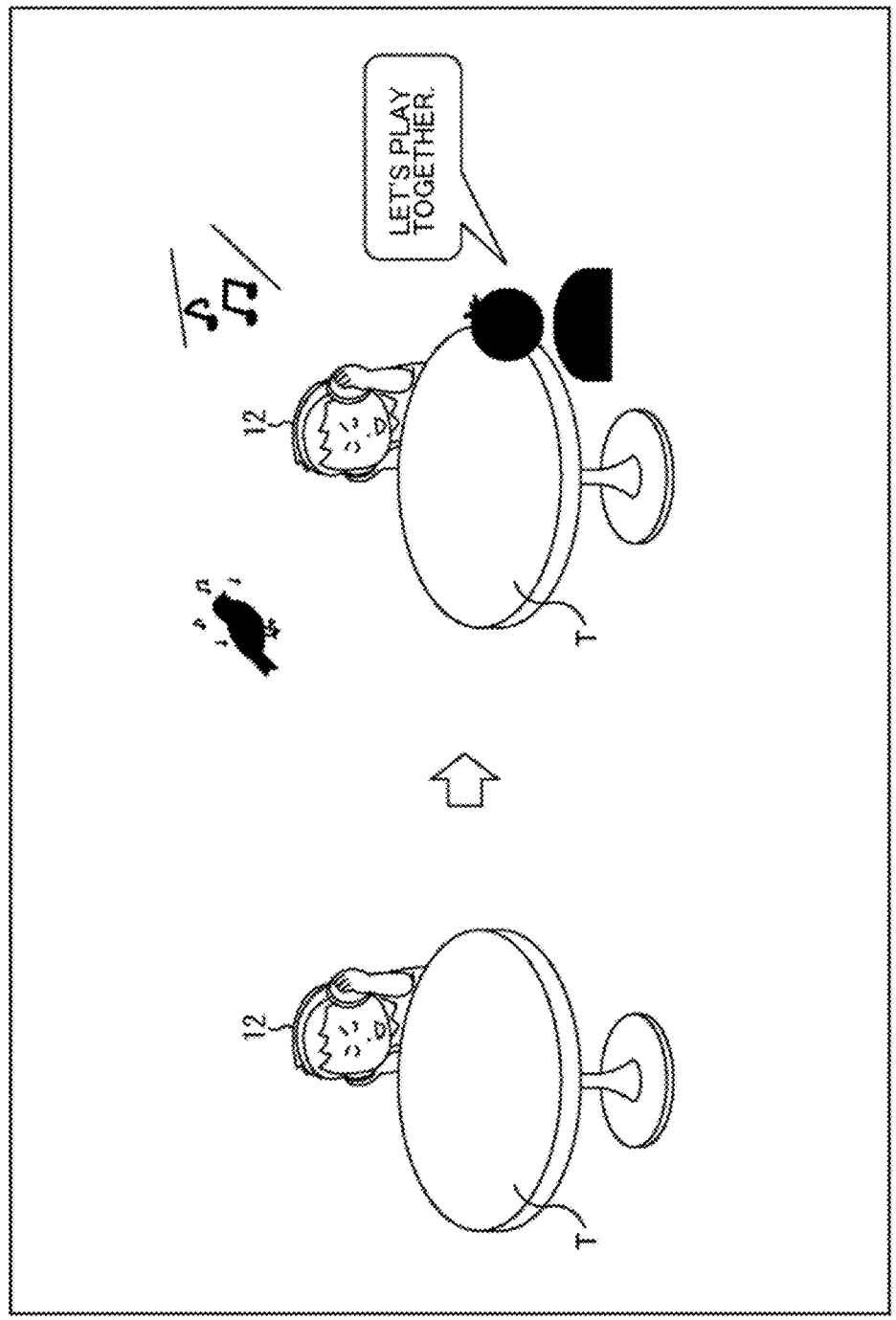
FIG. 2 illustrates a state in which a user listens to audiobook contents.

FIG. 2 illustrates a state in which a user listens to audiobook contents.

In the left example of FIG. 2, the user with the headphones 12 listens to audiobook contents around a table T.

Audio data constituting the audiobook contents includes object audio data. Using object audio allows the localization of a sound image of a character's voice or the like at a position specified by position information.

The position of a sound image of each object is controlled according to the intention of the production side, allowing the user to feel a sound image localized around the user as illustrated on the right side of FIG. 2. In the right example of FIG. 2, the user feels as if a voice of a character saying "Let's play together" is heard from the left front and a song of a little bird is heard from above. Furthermore, the user feels as if BGM is heard from away.

As described above, audiobook contents distributed in the contents distribution system in FIG. 1 are contents in which a sound can be reproduced as a stereoscopic sound.

The user can obtain realism in contrast to listening to a sound having not undergone stereoscopic sound processing. The user can also feel immersion in audiobook contents.

Stereoscopic sound can be implemented by using an HRTF (Head-Related Transfer Function) that mathematically expresses how a sound travels from a sound source to ears. An operation using an HRTF is performed in the reproducing device 11, so that a sound image is localized at a position set by the production side and the sound of each object is heard from each position.

Figure 3:
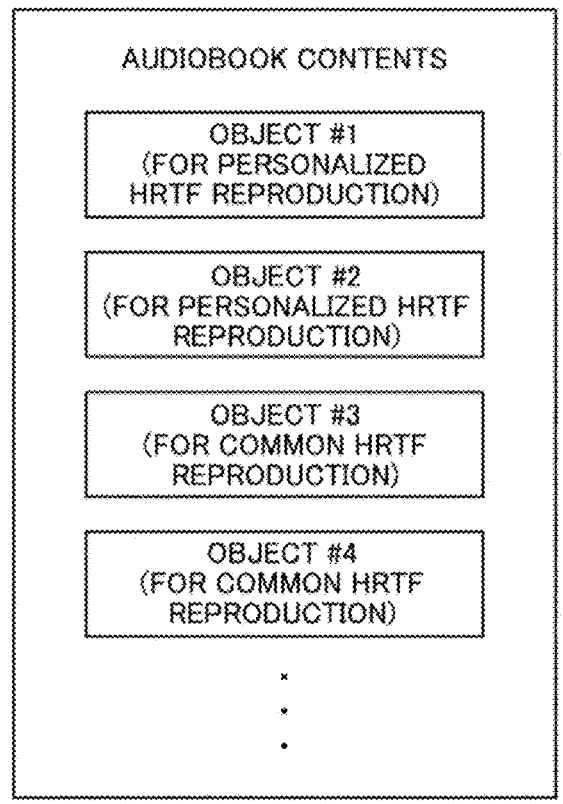
FIG. 3 illustrates an example of objects constituting audiobook contents.

FIG. 3 illustrates an example of objects constituting audiobook contents.

The audiobook contents are configured with audio data on a plurality of objects (audio objects) including objects reproduced by using personalized HRTFs and objects reproduced by using common HRTFs.

The personalized HRTF is an HRTF optimized (personalized) for the ear shape of a user who is a listener of the audiobook contents. Typically, HRTFs vary among the ear shapes and head shapes or the like of listeners. The personalized HRTF is a function that represents a different transfer characteristic for each user.

The common HRTF is an HRTF having not been subjected to the optimization. The same HRTF is shared among a plurality of listeners.

A sound reproduced by using the personalized HRTF allows a sound image to be localized with higher accuracy than a sound reproduced by using the common HRTF, achieving a sound with enhanced realism. In contrast, a sound reproduced by using the common HRTF allows a sound image to be localized with lower accuracy than a sound reproduced by using the personalized HRTF, achieving a sound with a roughly located sound image.

In the example of FIG. 3, objects #1 and #2 are personalized HRTF reproduction objects that are reproduced by using personalized HRTFs and #3 and #4 are common HRTF reproduction objects that are reproduced by using common HRTFs.

Figure 4:
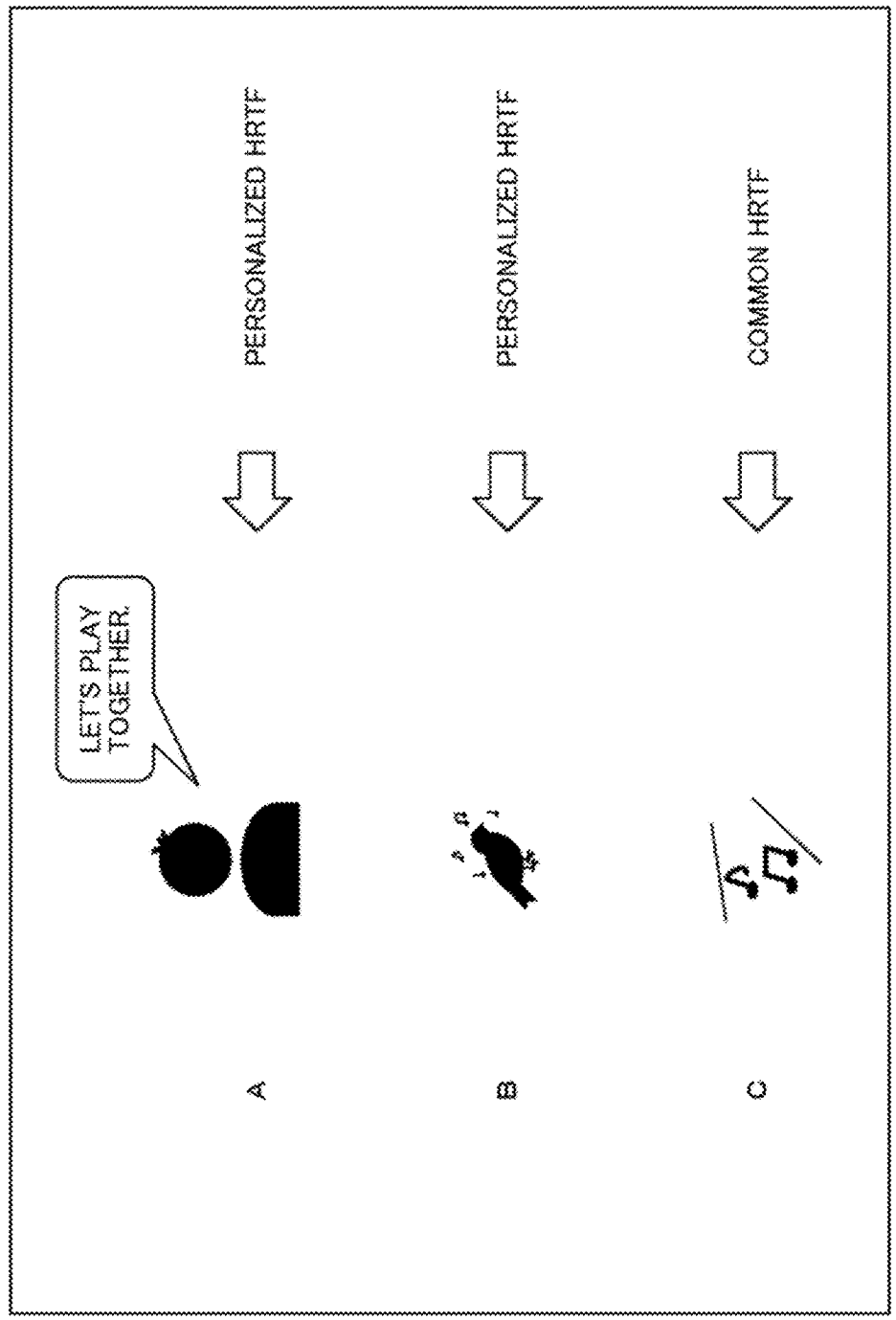
FIG. 4 illustrates an example of the use of HRTFs.

FIG. 4 illustrates an example of the use of the HRTFs.

As shown in A and B of FIG. 4, the personalized HRTFs are used for reproducing objects such as character's lines and bird songs that require a high degree of localization.

As shown in C of FIG. 4, the common HRTF is used for reproducing objects such as BGM that does not require a high degree of localization.

Whether to use an object as the personalized HRTF reproduction object or the common HRTF reproduction object is switched according to information on the importance of localization, the information being set by a producer. An object set with the importance of localization is reproduced as the personalized HRTF reproduction object.

As described above, audiobook contents reproduced in the reproducing device 11 are object audio contents including personalized HRTF reproduction objects and common HRTF reproduction objects. The detail of the data structure of audio contents will be described later.

The reproducing device 11 is a device for reproducing object audio contents including personalized HRTF reproduction objects serving as first objects and common HRTF reproduction objects serving as second objects. The reproduction of the contents is to perform object audio processing for outputting each object sound on the basis of object audio data and to perform at least part of the object audio processing.

<<Principle of Sound Image Localization Using HRTF>>

An HRTF is a transfer function that includes physical influence caused by reflection or diffraction on a sound wave propagating from a sound source to a tympanic membrane and is defined by the ratio of a sound pressure at a point where a listener's head is not present in a space and a sound pressure propagating to the positions of the left and right tympanic membranes of a listener if the center of the listener's head is superimposed on the same point. The HRTF is superimposed on an aural signal, and a change of sound is simulated when a sound wave propagates from a sound source in a space and reaches a tympanic membrane of the listener, thereby localizing a sound image for the listener.

Figure 5:
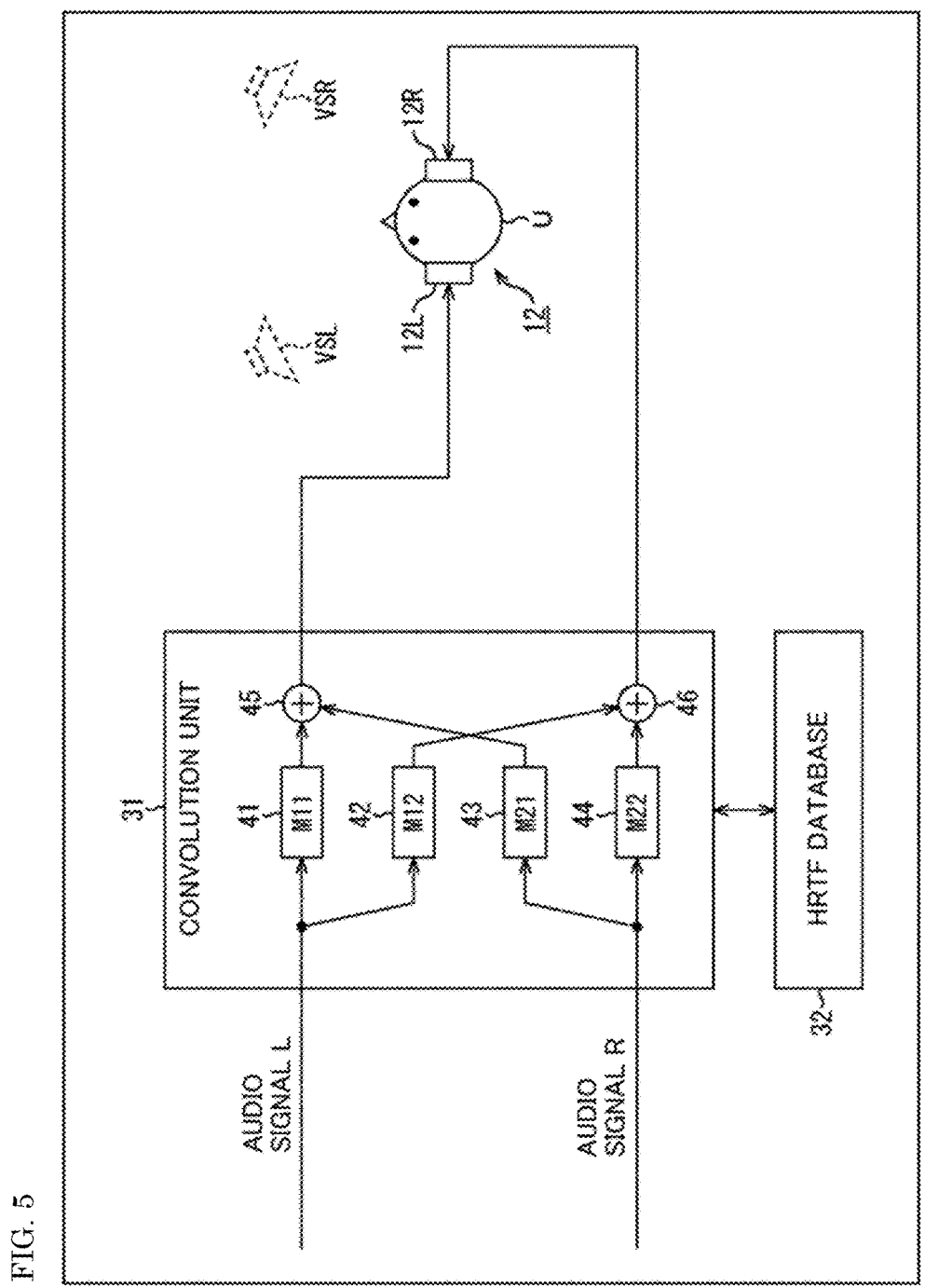
FIG. 5 illustrates an example of sound image localization processing.

FIG. 5 illustrates an example of sound image localization processing.

For example, an audio signal is inputted to a convolution unit 31 after rendering using object position information. Object audio data includes position information on the positions of objects as well as sound source data on the objects. The audio signal is a signal of various sounds including a voice, an ambient sound, and BGM. The audio signal includes an audio signal L as a signal for the left ear and an audio signal R as a signal for the right ear.

The convolution unit 31 processes the inputted audio signal such that an object sound is heard from the positions of a left virtual speaker VSL and a right virtual speaker VSR that are indicated by dashed lines in the right part of FIG. 5. In other words, the convolution unit 31 localizes the sound image of sound outputted from the headphones 12 such that a user U perceives the sound image as sound from the left virtual speaker VSL and the right virtual speaker VSR.

When the left virtual speaker VSL and the right virtual speaker VSR are not distinguished from each other, the speakers are collectively referred to as virtual speakers VS. In the example of FIG. 5, the virtual speakers VS are located in front of the user U and the number of virtual speakers is two.

The convolution unit 31 performs, on the audio signal, sound image localization for outputting the sound and outputs the audio signal L and the audio signal R respectively to a left-side unit 12L and a right-side unit 12R of the headphones 12 after the sound image localization. The left-side unit 12L constituting the headphones 12 is attached to the left ear of the user U, and the right-side unit 12R is attached to the right ear.

Figure 6:
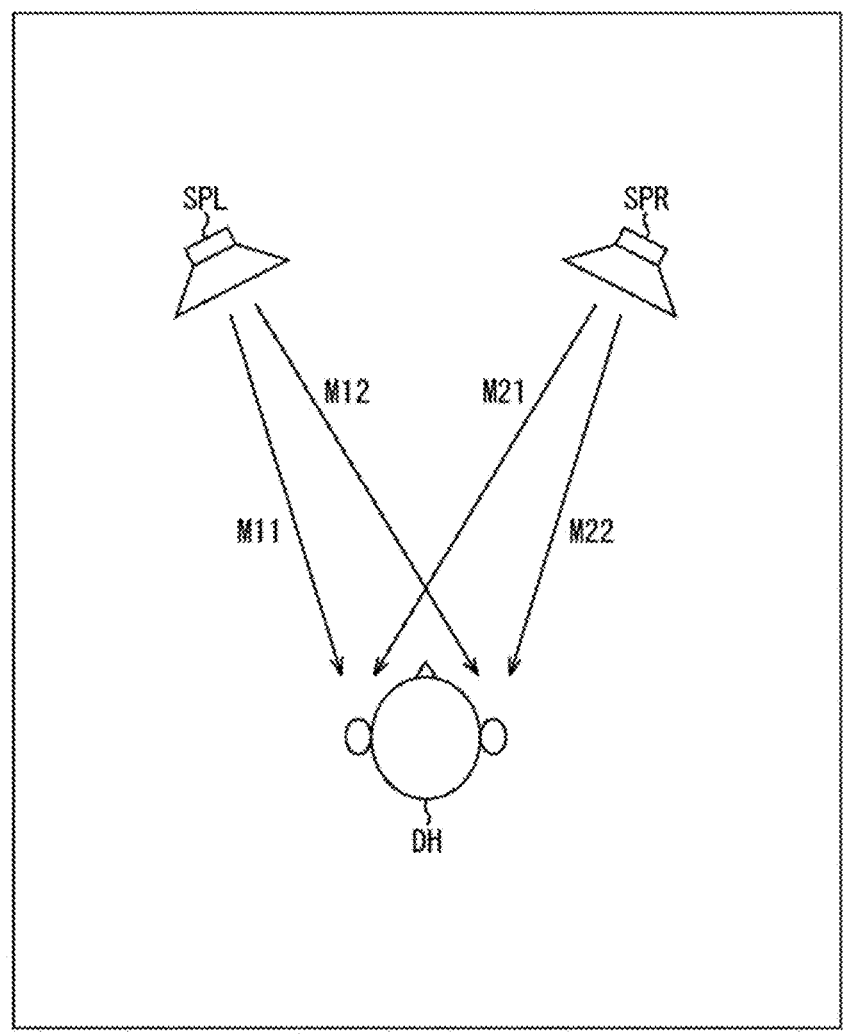
FIG. 6 illustrates an example of the measurements of the HRTFs.

FIG. 6 illustrates an example of the measurements of the HRTFs.

In a predetermined reference environment, the position of a dummy head DH is set as the listener's position. Microphones are installed in the left and right ear parts of the dummy head DH. A left real speaker SPL and a right real speaker SPR are installed at the positions of left and right virtual speakers where a sound image is to be localized. The real speakers refer to actually installed speakers.

Sound outputted from the left real speaker SPL and the right real speaker SPR is collected at the ear parts of the dummy head DH, and a transfer function is measured as an HRTF in advance, the transfer function representing a change of the characteristic of the sound when the sound outputted from the left and right real speakers SPL and SPR reaches the ear parts of the dummy head DH. The transfer function may be measured for a person actually seated with microphones placed near the ears of the person without using the dummy head DH.

As illustrated in FIG. 6, it is assumed that a sound transfer function from the left real speaker SPL to the left ear of the dummy head DH is M11 and a sound transfer function from the left real speaker SPL to the right ear of the dummy head DH is M12. Also, it is assumed that a sound transfer function from the right real speaker SPR to the left ear of the dummy head DH is M21, and a sound transfer function from the right real speaker SPR to the right ear of the dummy head DH is M22.

An HRTF database 32 in FIG. 5 stores information on HRTFs (information on coefficients representing the HRTFs) as the transfer functions measured in advance.

The convolution unit 31 reads and obtains, from the HRTF database 32, HRTFs corresponding to the positions of the left virtual speaker VSL and the right virtual speaker VSR and sets the HRTFs for filters 41 to 44.

The filter 41 performs filtering for applying the transfer function M11 to the audio signal L and outputs the filtered audio signal L to an addition unit 45. The filter 42 performs filtering for applying the transfer function M12 to the audio signal L and outputs the filtered audio signal L to an addition unit 46.

The filter 43 performs filtering for applying the transfer function M21 to the audio signal R and outputs the filtered audio signal R to the addition unit 45. The filter 44 performs filtering for applying the transfer function M22 to the audio signal R and outputs the filtered audio signal R to the addition unit 46.

The addition unit 45 as an addition unit for the left channel adds the audio signal L filtered by the filter 41 and the audio signal R filtered by the filter 43 and outputs the audio signal after the addition. The audio signal after the addition is transmitted to the headphones 12, and a sound corresponding to the audio signal is outputted from the left-side unit 12L of the headphones 12.

The addition unit 46 as an addition unit for the right channel adds the audio signal L filtered by the filter 42 and the audio signal R filtered by the filter 44 and outputs the audio signal after the addition. The audio signal after the addition is transmitted to the headphones 12, and a sound corresponding to the audio signal is outputted from the right-side unit 12R of the headphones 12.

In this way, the convolution unit 31 performs convolution on the audio signal by using an HRTF corresponding to a position (object position) where a sound image is to be localized, and localizes the sound image of the sound from the headphones 12 such that the user U perceives the sound image as a sound emitted from the virtual speakers VS.

<<Detail of Audiobook Contents>>
<Measurement of HRTF>

Figure 7:
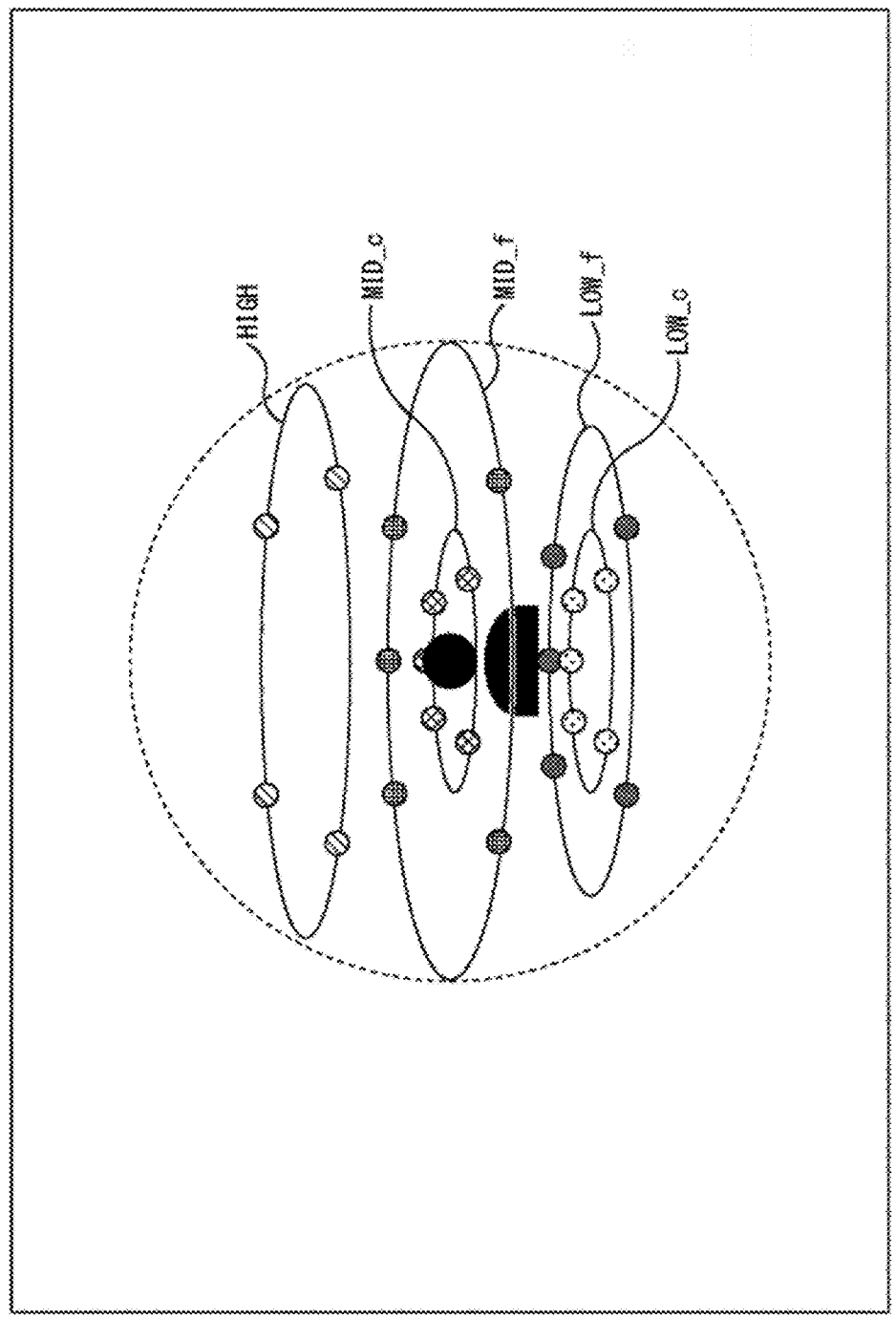
FIG. 7 illustrates an example of the layout of speakers when the HRTFs are measured.

FIG. 7 illustrates an example of the layout of speakers when HRTFs for audiobook contents are measured.

As illustrated in FIG. 7, the speakers are actually disposed at various positions at different heights and in different directions with respect to the position of a measurer. In this state, the HRTFs corresponding to the positions of the speakers are measured. Small circles represent the positions of the speakers.

In the example of FIG. 7, three layers, that is, a HIGH layer, a MID layer, and a LOW layer are set and the speakers are disposed in the respective layers at different heights. For example, the MID layer is set at the same height as the ears of the measurer. The HIGH layer is set higher than the ears of the measurer. The LOW layer is set lower than the ears of the measurer.

The MID layer includes a MID_f layer and a MID_c layer set inside the MID_f layer. The LOW layer includes a LOW_f layer and a LOW_c layer set inside the LOW_f layer.

Figure 8:
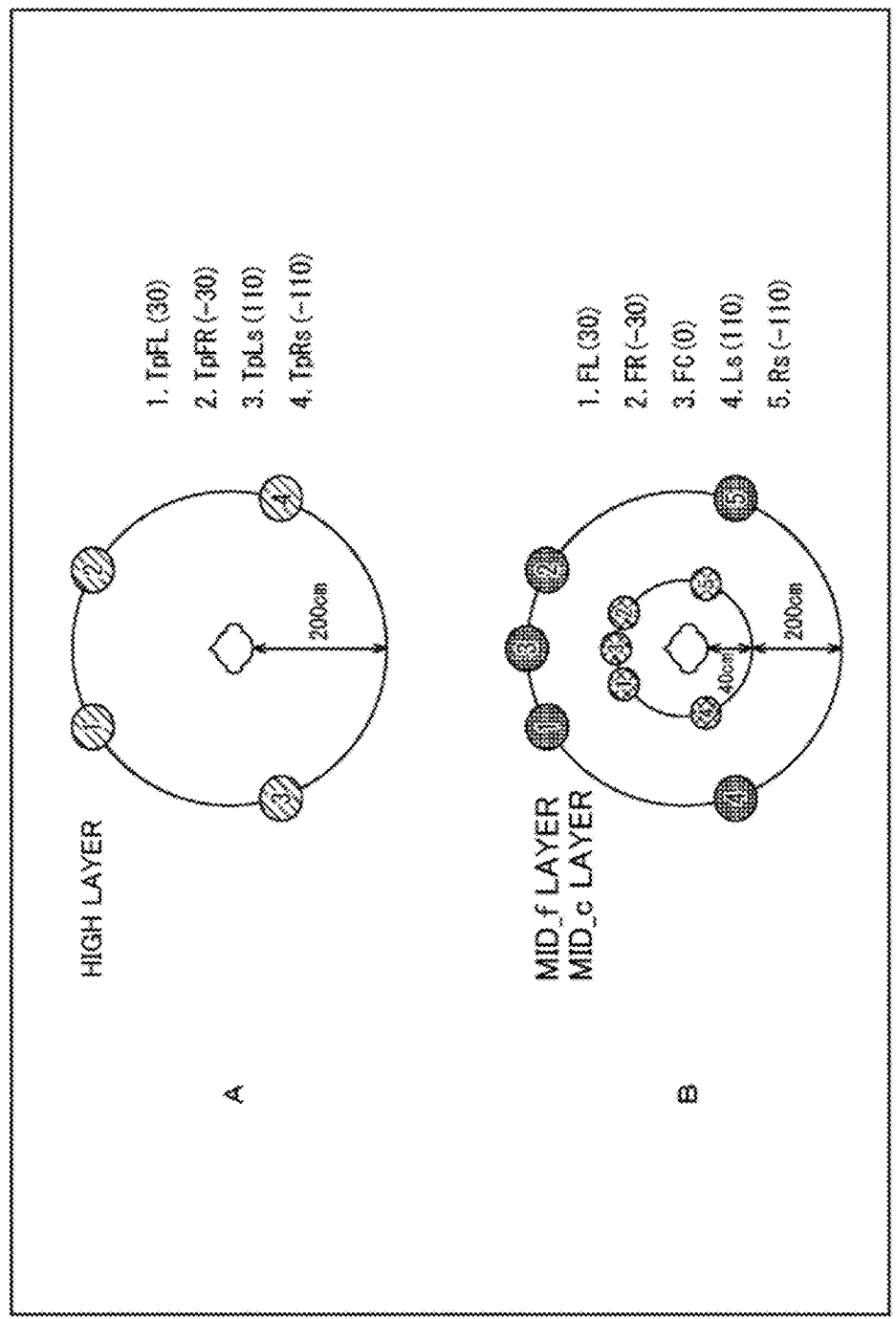
FIG. 8 illustrates the layouts of speakers of layers.
Figure 9:
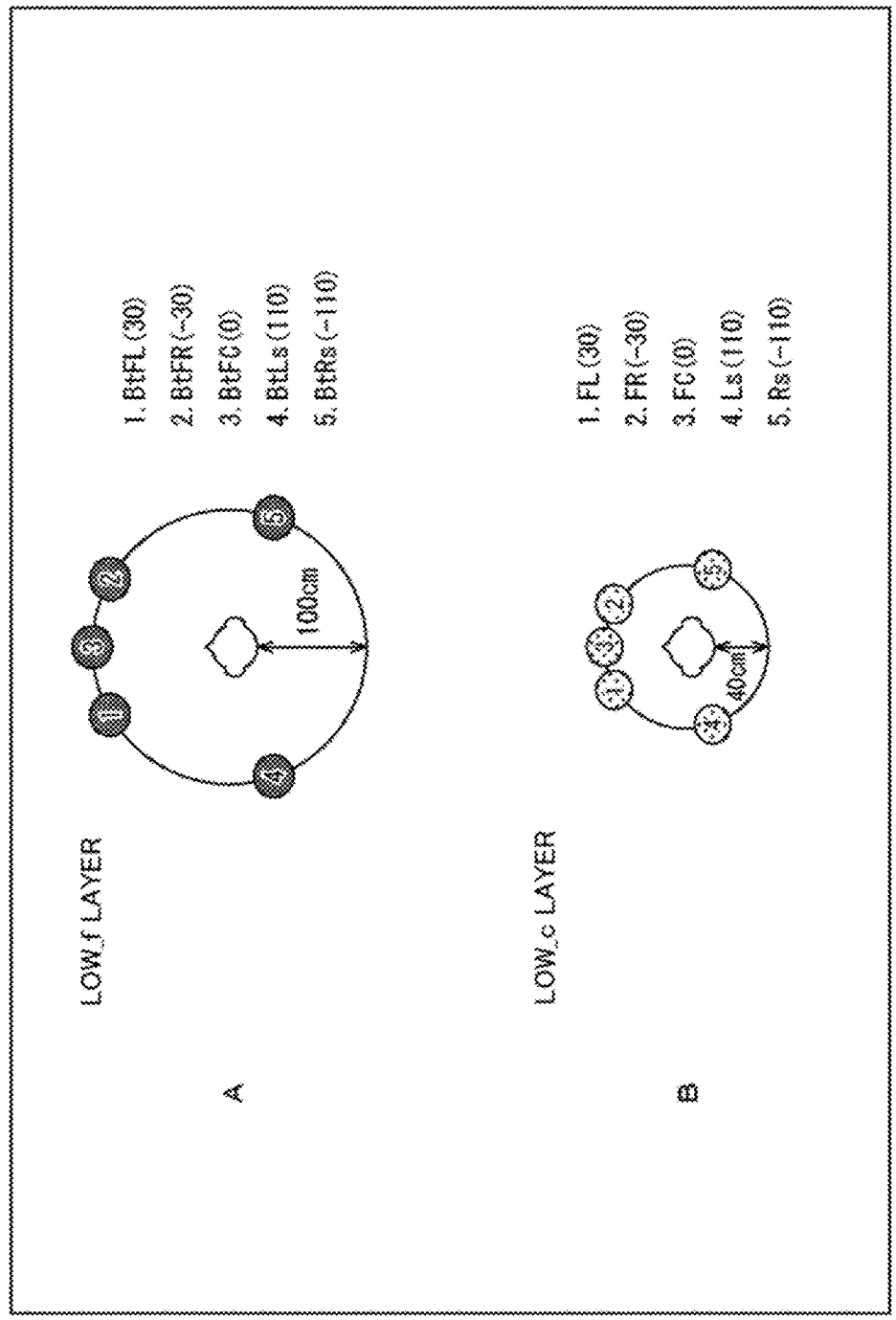
FIG. 9 is another diagram illustrating the layouts of speakers of layers.

FIGS. 8 and 9 illustrate the layouts of the speakers of the layers. Circles encircling numbers represent the positions of the speakers of the layers. In FIGS. 8 and 9, an upward direction is the front direction of the measurer.

A of FIG. 8 is a top view illustrating the layout of the speakers of the HIGH layer. The speakers of the HIGH layer are four speakers: a speaker TpFL, a speaker TpFR, a speaker TpLs, and a speaker TpRs that are set on the circumference of a circle having a radius of 200 cm with respect to the position of the measurer.

For example, the speaker TpFL is set at the position of 30° on the left with respect to the front of the measurer. The speaker TpFR is set at the position of 30° on the right with respect to the front of the measurer.

B of FIG. 8 is a top view illustrating the layout of the speakers of the MID layer.

The speakers of the MID_f layer are five speakers set on the circumference of a circle having a radius of 200 cm with respect to the position of the measurer. The speakers of the MID_c layer are five speakers set on the circumference of a circle having a radius of 40 cm with respect to the position of the measurer.

For example, the speaker FL of the MID_f layer and the speaker FL of the MID_c layer are set at the position of 30° on the left with respect to the front of the measurer. The speaker FR of the MID_f layer and the speaker FR of the MID_c layer are set at the position of 30° on the right with respect to the front of the measurer. The five speakers set in the same directions with respect to the front of the measurer constitute the speakers in the MID_f layer and the MID_c layer.

As illustrated in A and B of FIG. 9, the speakers are set on the circumferences of two circles having different radii with respect to the position of the measurer in the LOW_f layer and the LOW_c layer.

HRTFs are measured for the positions of the speakers on the basis of sounds outputted from the speakers set in this layout. An HRTF corresponding to a speaker position (sound source position) is determined by measuring, at the positions of the ears of a measurer or the ears of a dummy head, an impulse response from the position and expressing the impulse response on a frequency axis.

An HRTF measured using a dummy head may be used as a common HRTF. Alternatively, many persons may be actually seated at the position of the measurer in FIG. 7 and the average of HRTFs measured at the positions of the ears may be used as a common HRTF.

Reproduction using the HRTFs measured in this manner allows the localization of a sound image of an object at different positions varying in direction, height, and distance. A user listening to audiobook contents can feel immersion in the world of a story.

Example of Object

Figure 10:
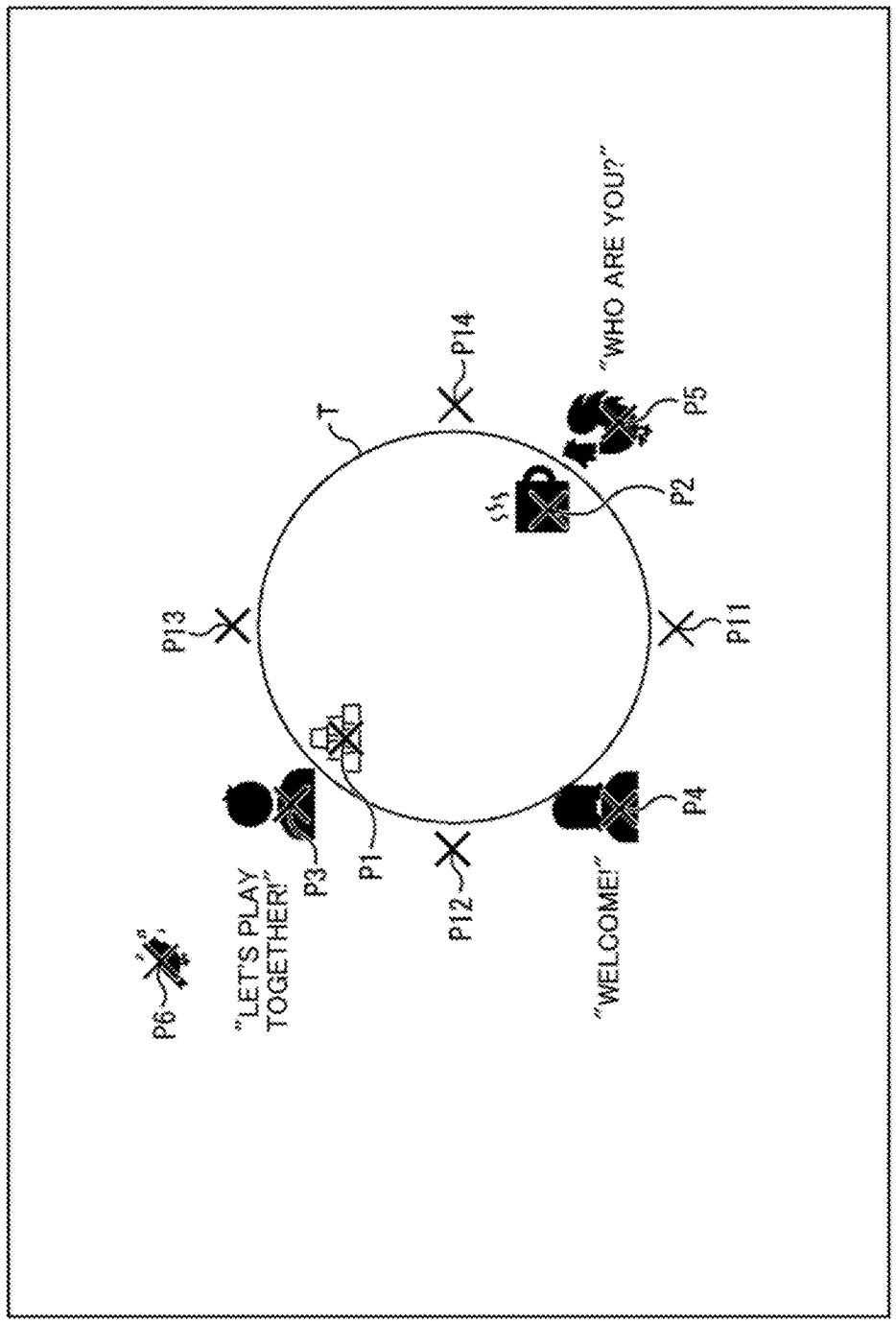
FIG. 10 illustrates an example of the layout of objects.

FIG. 10 illustrates an example of the layout of objects.

As illustrated in FIG. 10, objects are disposed at positions P1 and P2 on the table T and positions P3 to P6 around the table T. Audio data used for reproducing the sounds of the objects in FIG. 10 is included in audiobook contents.

In the example of FIG. 10, the object at the position P1 is the sound of blocks and the object at the position P2 is the sound of tea poured into a cup. The object at the position P3 is a line of a boy and the object at the position P4 is a line of a girl. The object at the position P5 is a line of a chicken speaking human words and the object at the position P6 is a song of a bird. The position P6 is a position above the position P3.

Positions P11 to P14 are the positions of users serving as listeners. For example, the user at the position P11 hears a line of the boy at the position P3 from the left side of the back and hears a line of the girl at the position P4 from the left.

The objects disposed near the user in FIG. 10 are reproduced as, for example, personalized HRTF reproduction objects. Objects such as an ambient sound and BGM other than the objects in FIG. 10 are reproduced as common HRTF reproduction objects. The ambient sound includes the murmur of a running brook and the sound of leaves trembling in the breeze.

Figure 11:
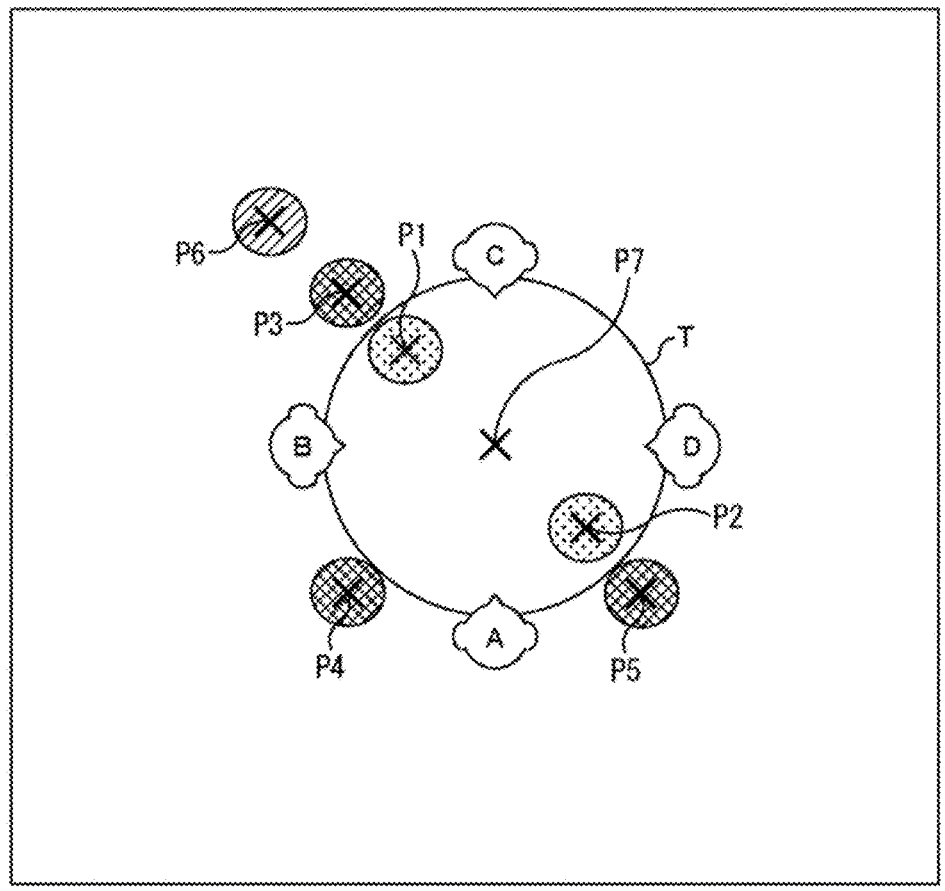
FIG. 11 is a schematic diagram of the positions of the objects.

FIG. 11 is a schematic diagram of the positions of the personalized HRTF reproduction objects.

In the example of FIG. 11, users A to D are assumed to be located at the positions P11 to P14 around the table T. Circles represent the objects described with reference to FIG. 10.

For example, the objects at the positions P1 and P2 are reproduced by using the HRTFs corresponding to the positions of the speakers of the LOW_c layer. The objects at the positions P3, P4, and P5 are reproduced by using the HRTFs corresponding to the positions of the speakers of the MID_c layer. The object at the position P6 is reproduced by using the HRTF corresponding to the position of the speaker of the HIGH layer. The position P7 is used as the position of a sound image when a movement of the block object at the position P2 is expressed.

The objects are disposed at the positions P1 to P7 set as absolute positions. Specifically, at different listening positions, the sounds of the objects are heard in different directions as illustrated in FIG. 12.

Figure 12:
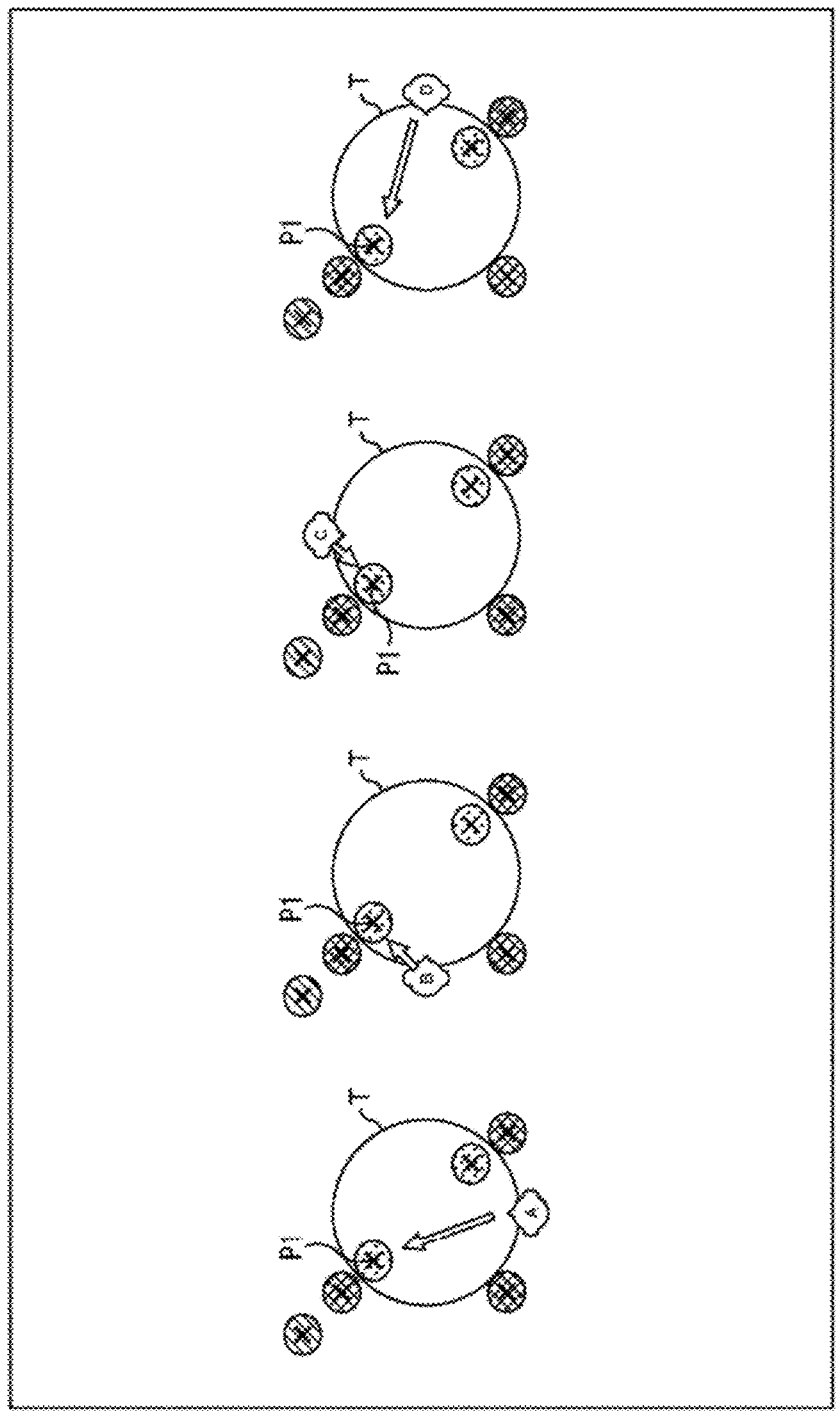
FIG. 12 illustrates the directions of sounds from the objects.

For example, in the example of FIG. 12, a sound of the blocks at the position P1 is heard remotely from the left by the user A and is heard closely from the left by the user B. The sound is heard closely from the right by the user C and is heard remotely from the right by the user D.

The HRTFs at the respective listening positions are measured by using the speaker layout described with reference to FIG. 7, thereby fixing the absolute positions of the objects.

Figure 13:
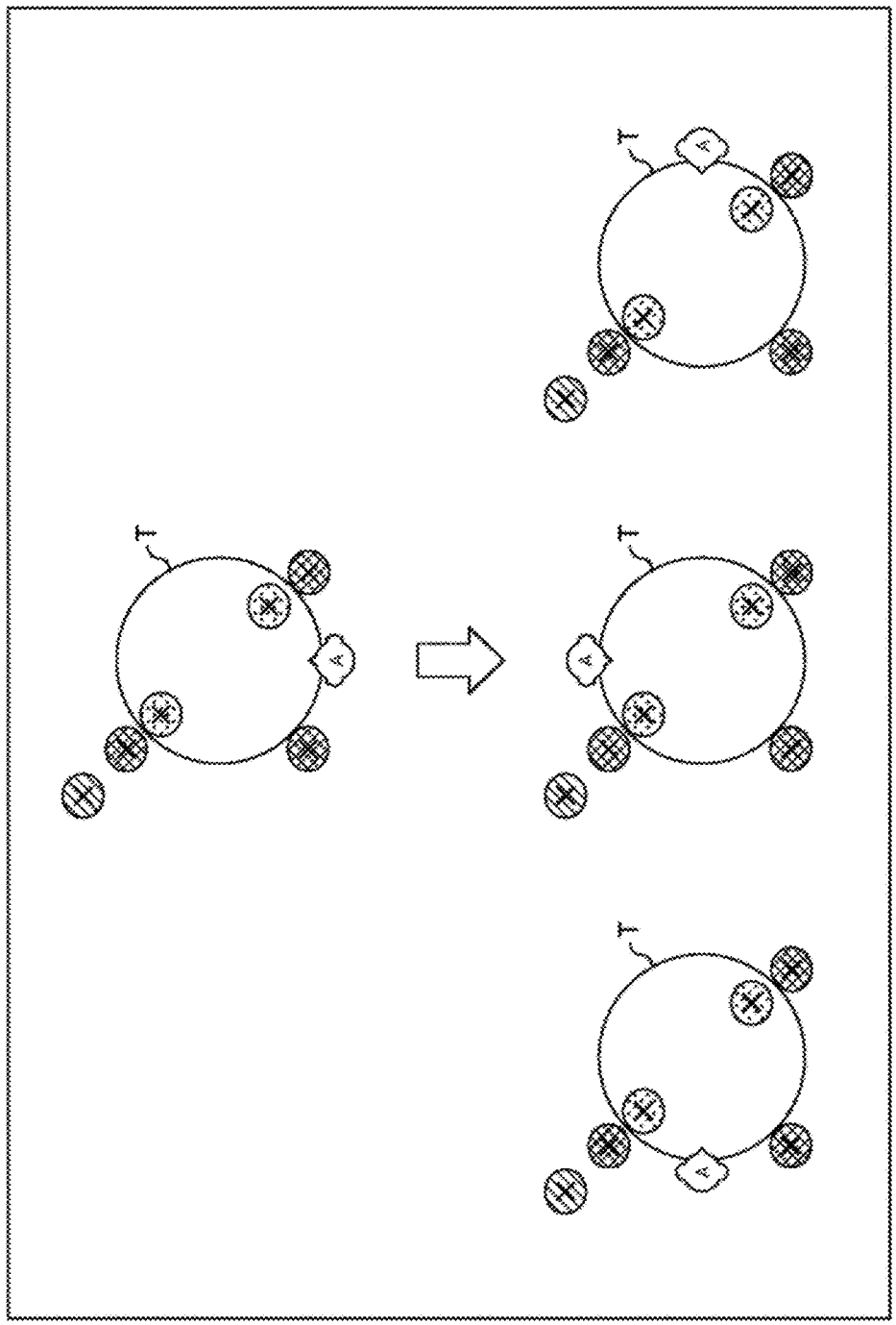
FIG. 13 illustrates an example in which a listening position is changed.

Since the absolute positions of the objects are fixed, as illustrated in FIG. 13, the user can change the listening position during the reproduction of audiobook contents.

In the example of FIG. 13, the user A listening to audiobook contents at the position P11 moves to another position among the positions P12 to P14. Each time the user A changes the listening position, the HRTFs used for reproducing the objects are switched.

By changing the listening position, the user can move close to a voice of a favorite voice talent or approach a voice to confirm the contents of the voice. Moreover, by changing the listening position, the user can enjoy the same audiobook contents while listening to the contents in a different manner.

<<Configuration of Each Device>>

<Configuration of Content Production Device 1>

Figure 14:
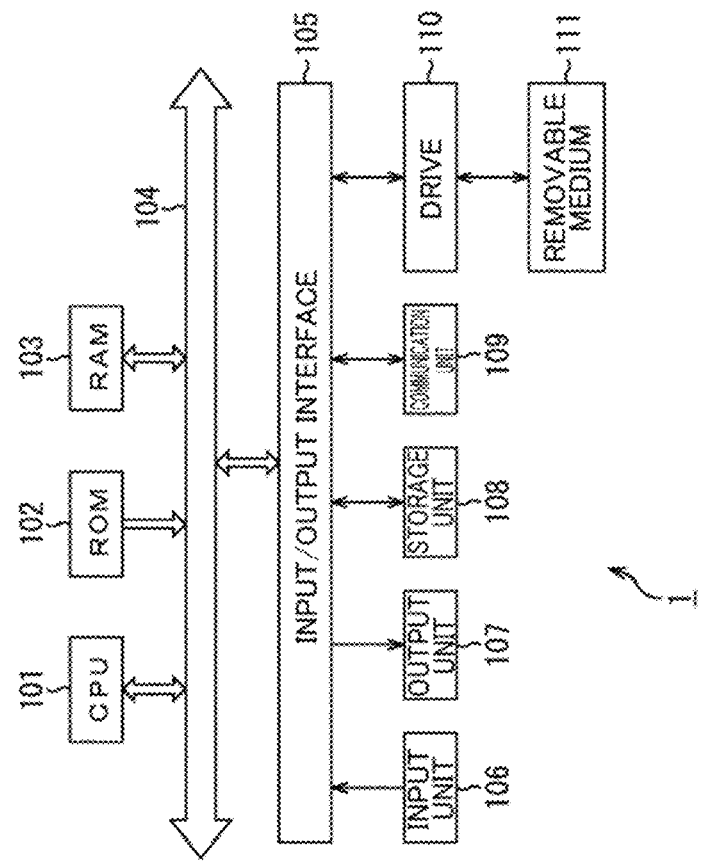
FIG. 14 is a block diagram illustrating a hardware configuration example of a content production device.

FIG. 14 is a block diagram illustrating a configuration example of the content production device 1.

The content production device 1 is configured with a computer. The content production device 1 may be configured with a single computer configured as illustrated in FIG. 14 or configured with a plurality of computers.

A CPU 101, a ROM 102, and a RAM 103 are connected to one another via a bus 104.

An input/output interface 105 is further connected to the bus 104. An input unit 106 including a keyboard and a mouse and an output unit 107 including a display and a speaker are connected to the input/output interface 105. Various operations for producing audiobook contents are performed by a producer using the input unit 106.

In addition, a storage unit 108 including a hard disk and a nonvolatile memory, a communication unit 109 including a network interface, and a drive 110 that drives a removable medium 111 are connected to the input/output interface 105.

The content management device 2 has the same configuration as the content production device 1 illustrated in FIG. 14. Hereinafter, the configuration of FIG. 14 is cited as the configuration of the content management device 2 as appropriate.

Figure 15:
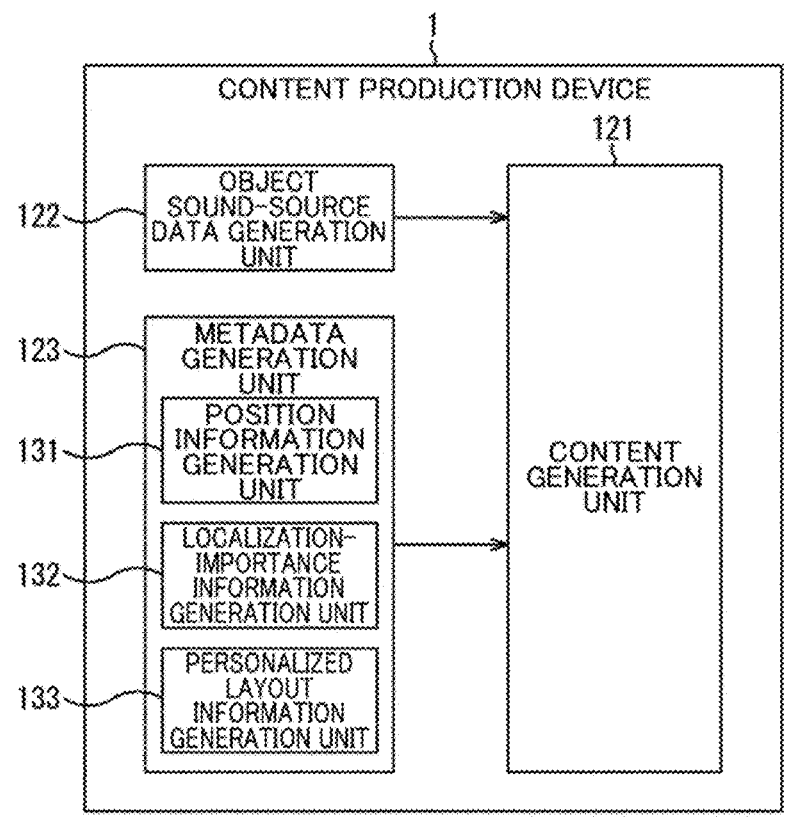
FIG. 15 is a block diagram illustrating a functional configuration example of the content production device.

FIG. 15 is a block diagram illustrating a functional configuration example of the content production device 1.

In the content production device 1, a content generation unit 121, an object sound-source data generation unit 122, and a metadata generation unit 123 are implemented. At least some of the functional units of FIG. 15 are implemented by causing the CPU 101 of FIG. 14 to execute a predetermined program.

The content generation unit 121 generates audiobook contents by linking object sound source data generated by the object sound-source data generation unit 122 and object metadata generated by the metadata generation unit 123.

Figure 16:
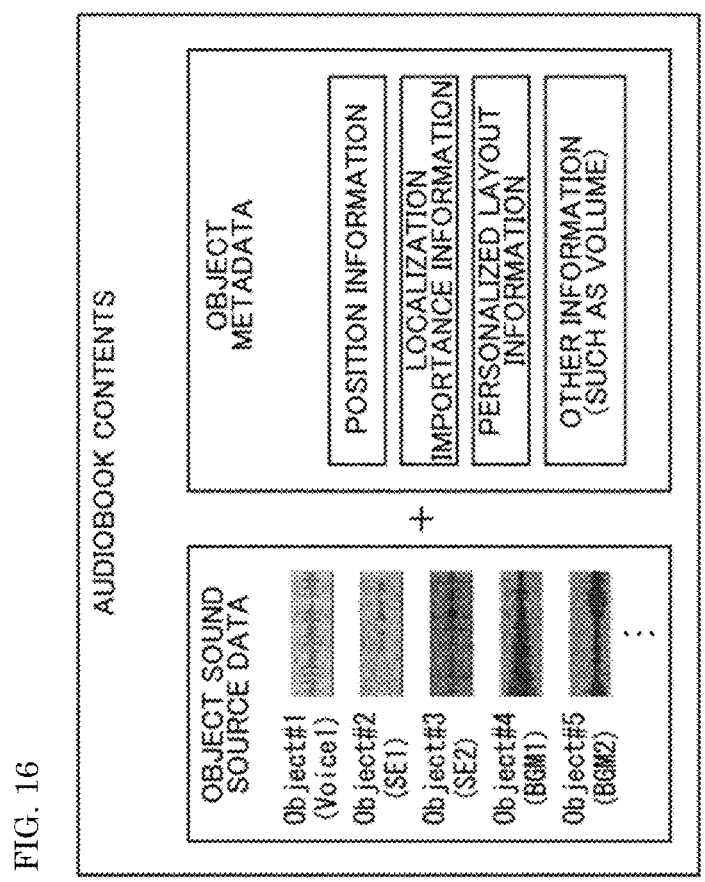
FIG. 16 illustrates a configuration example of audiobook contents.

FIG. 16 illustrates a configuration example of audiobook contents.

As illustrated in FIG. 16, the audiobook contents include object sound source data and object metadata.

In the example of FIG. 16, sound source data (waveform data) on five objects: Objects #1 to #5 is included as object sound source data. In the example, sound source data on sounds including a sound of blocks, a sound of tea poured into a cup, and a line of a boy is included as object sound source data in the audiobook contents.

The object metadata includes position information, localization importance information, personalized layout information, and other kinds of information. The other kinds of information include information on the volumes of objects.

The position information included in the object metadata is information on the positions of objects.

The localization importance information is a flag indicating the importance of sound-image localization. The importance of sound-image localization is set for each object by, for example, a producer. The importance of sound-image localization is represented as, for example, a numeric value from 1 to 10. As will be described later, whether each object is to be reproduced as a personalized HRTF reproduction object or a common HRTF reproduction object is selected on the basis of the localization importance information.

The personalized layout information is information on a speaker layout when an HRTF is measured. The speaker layout described with reference to FIG. 7 and other drawings is expressed by the personalized layout information. The personalized layout information is used by the reproducing device 11 when a personalized HRTF is acquired.

The object sound-source data generation unit 122 in FIG. 15 generates sound source data on each object. The sound source data on each object is acquired into the content production device 1 after being recorded in a studio or the like, and the data is generated as object sound source data. The content generation unit 121 outputs the object sound source data to the content generation unit 121.

The metadata generation unit 123 generates object metadata and outputs the data to the content generation unit 121. The metadata generation unit 123 includes a position information generation unit 131, a localization-importance information generation unit 132, and a personalized layout information generation unit 133.

The position information generation unit 131 generates position information on the position of each object according to the setting of the producer.

The localization-importance information generation unit 132 generates localization importance information according to the setting of the producer.

For example, the importance of localization is set according to the following contents:

A distance from a listening position to the position of an object
The height of an object
The direction of an object
Whether an object is to be listened with concentration When the importance of localization is set according to a distance from a listening position to the position of an object, as a value indicating the importance of localization, a high value is set for, for example, an object disposed near the listening position. In this case, with respect to a distance serving as a threshold value, an object disposed near the listening position is reproduced as a personalized HRTF reproduction object, whereas an object disposed remote from the listening position is reproduced as a common HRTF reproduction object.

When the importance of localization is set according to the height of an object, as a value indicating the importance of localization, a high value is set for, for example, an object disposed at a high position. In this case, with respect to a height serving as a threshold value, an object disposed higher than a reference position is reproduced as a personalized HRTF reproduction object, whereas an object disposed lower than the reference position is reproduced as a common HRTF reproduction object.

When the importance of localization is set according to the direction of an object, as a value indicating the importance of localization, a high value is set for, for example, an object disposed in a direction close to the front of a listener. In this case, with respect to the front of the listener, an object disposed in a direction in a predetermined range is reproduced as a personalized HRTF reproduction object, whereas an object disposed in a direction outside the range is reproduced as a common HRTF reproduction object.

When the importance of localization is set according to whether an object is to be listened with concentration, as a value indicating the importance of localization, a high value is set for, for example, an object to be listened with concentration.

The importance of localization may be set by using a combination of at least some of a distance from a listening position to the position of an object, the height of an object, the direction of an object, and whether an object is to be listened with concentration.

In this way, the content production device 1 functions as an information processing device that generates metadata including a flag used as a criterion for selecting whether each object is to be reproduced as personalized HRTF reproduction contents or common HRTF reproduction contents.

The personalized layout information generation unit 133 generates the personalized layout information according to the setting of the producer.

<Configuration of Content Management Device 2>

Figure 17:
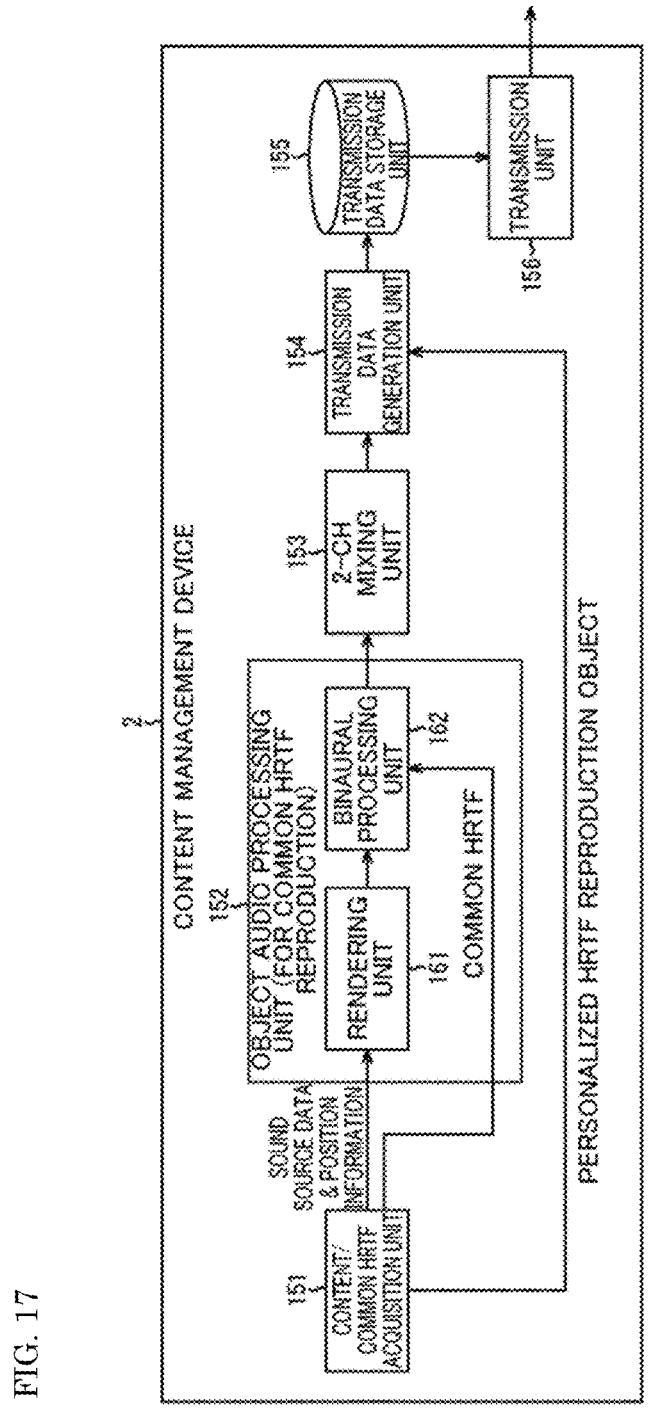
FIG. 17 is a block diagram illustrating a functional configuration example of a content management device.

FIG. 17 is a block diagram illustrating a functional configuration example of the content management device 2.

In the content management device 2, a content/common HRTF acquisition unit 151, an object audio processing unit 152, a 2-ch mixing unit 153, a transmission data generation unit 154, a transmission data storage unit 155, and a transmission unit 156 are implemented. At least some of the functional units illustrated in FIG. 17 are implemented by causing the CPU 101 in FIG. 14 to execute a predetermined program, the CPU 101 constituting the content management device 2.

The content/common HRTF acquisition unit 151 acquires audiobook contents generated by the content production device 1. For example, the content/common HRTF acquisition unit 151 controls the communication unit 109 and receives and acquires the audiobook contents transmitted from the content production device 1.

Furthermore, the content/common HRTF acquisition unit 151 acquires a common HRTF for objects included in the audiobook contents. To the content management device 2, for example, information on a common HRTF measured on the production side of audiobook contents is inputted.

The common HRTF may be included in audiobook contents as data constituting the audiobook contents, and the common HRTF may be acquired with the audiobook contents.

The content/common HRTF acquisition unit 151 selects a personalized HRTF reproduction object and a common HRTF reproduction object from objects constituting the audiobook contents on the basis of localization importance information included in object metadata. When the importance of sound-image localization is expressed by a numeric value from 1 to 10, for example, an object in which the importance of sound-image localization is equal to or higher than a threshold value is selected as a personalized HRTF reproduction object, whereas an object in which the importance of sound-image localization is lower than the threshold value is selected as a common HRTF reproduction object.

The content/common HRTF acquisition unit 151 outputs audio data on the object selected as the personalized HRTF reproduction object, to the transmission data generation unit 154.

Moreover, the content/common HRTF acquisition unit 151 outputs audio data on the object selected as the common HRTF reproduction object, to a rendering unit 161 of the object audio processing unit 152. The content/common HRTF acquisition unit 151 outputs the acquired common HRTF to a binaural processing unit 162.

When a plurality of transmission data pieces varying in the number of personalized HRTF reproduction objects are generated, a personalized HRTF reproduction object and a common HRTF reproduction object are repeatedly selected on the basis of the localization importance information while changing a value serving as a threshold value.

The object audio processing unit 152 performs object audio processing on audio data on the common HRTF reproduction object supplied from the content/common HRTF acquisition unit 151. The object audio processing serving as stereoscopic sound processing includes rendering and binaural processing on objects.

Specifically, in this example, the object audio processing on the common HRTF reproduction object among objects constituting audiobook contents is performed in the content management device 2 that is a device on the transmission side. This can reduce a load of processing in the reproducing device 11 as compared with the transmission of audio data on all objects constituting audiobook contents to the reproducing device 11.

The object audio processing unit 152 includes the rendering unit 161 and the binaural processing unit 162.

The rendering unit 161 performs rendering on the common HRTF reproduction object on the basis of position information or the like and outputs audio data obtained by rendering to the binaural processing unit 162. Rendering such as VBAP (Vector Based Amplitude Panning) is performed by the rendering unit 161 on the basis of the audio data on the common HRTF reproduction object.

The binaural processing unit 162 performs binaural processing using the common HRTF on the audio data on objects supplied from the rendering unit 161 and outputs an audio signal obtained by the binaural processing. The binaural processing performed by the binaural processing unit 162 includes the convolution described with reference to FIGS. 5 and 6.

If a plurality of objects are selected as common HRTF reproduction objects, the 2-ch mixing unit 153 performs 2-ch mixing on an audio signal generated on the basis of audio data on the objects.

By performing 2-ch mixing, channel-base audio data including the audio signal L and the audio signal R of the common HRTF reproduction objects is generated. The 2-ch mixed audio data (channel-base audio data) obtained by 2-ch mixing is outputted to the transmission data generation unit 154.

The transmission data generation unit 154 generates transmitted data by linking audio data on the personalized HRTF reproduction object from the content/common HRTF acquisition unit 151 and the 2-ch mixed audio data on the common HRTF reproduction object from the 2-ch mixing unit 153. The audio data on the personalized HRTF reproduction object includes object metadata such as position information and personalized layout information.

Figure 18:
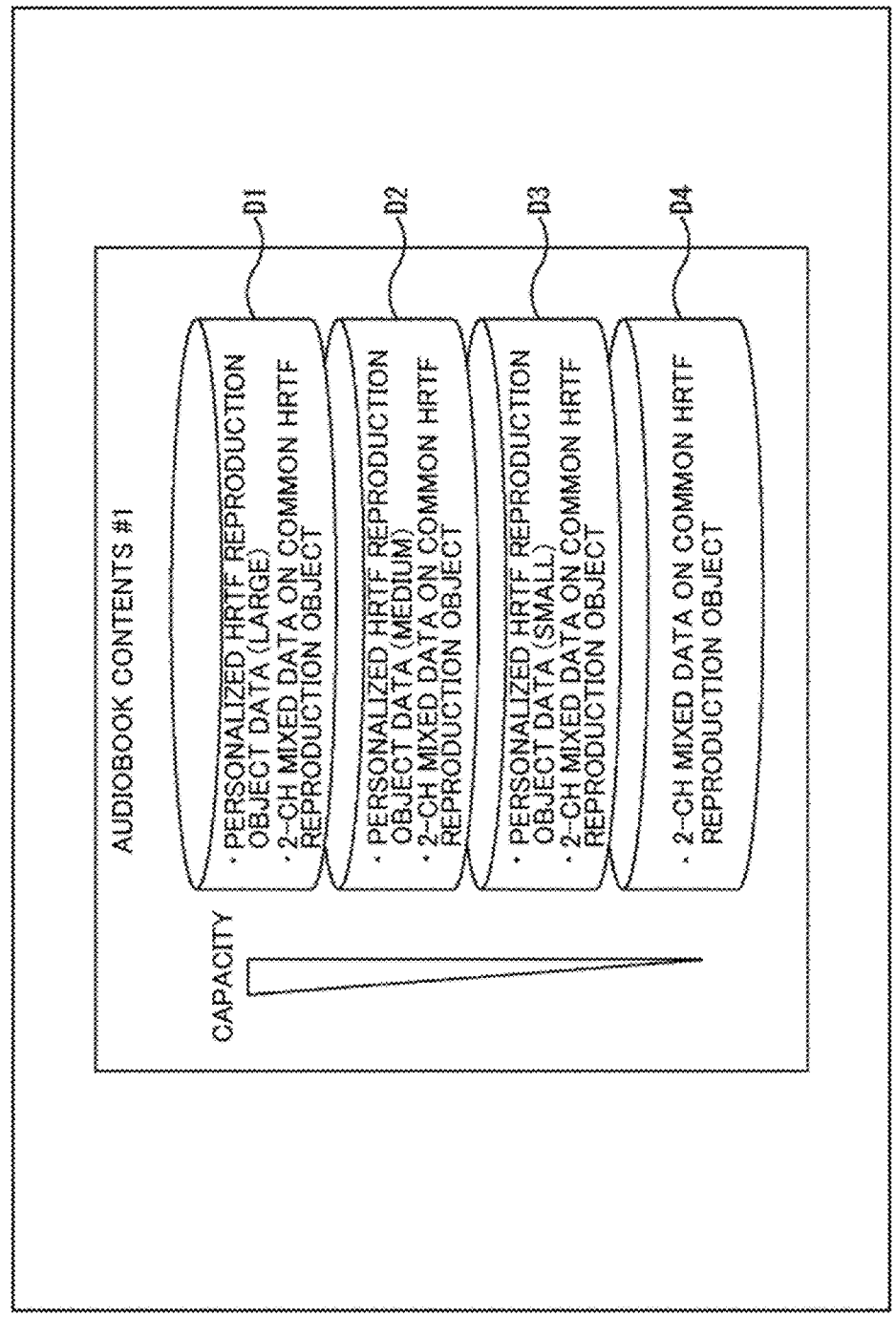
FIG. 18 illustrates an example of transmission data.

FIG. 18 illustrates an example of the transmission data.

As illustrated in FIG. 18, a plurality of kinds of transmission data varying in the number of personalized HRTF reproduction objects are generated for each title of audiobook contents.

Basically, the data amount of the transmission data increases with the number of personalized HRTF reproduction objects. Moreover, the object audio processing is performed by using personalized HRTFs and thus the number of objects with accurate localization increases with the number of personalized HRTF reproduction objects. This allows the user to obtain enhanced realism.

In the example of FIG. 18, transmission data pieces D1 to D4 are generated as the transmission data of audiobook contents #1 in descending order of the data amount.

The transmission data pieces D1 to D3 are transmission data having a large number of personalized HRTF reproduction objects, transmission data having an intermediate number of personalized HRTF reproduction objects, and transmission data having a small number of personalized HRTF reproduction objects. The transmission data pieces D1 to D3 each include 2-ch mixed audio data on the common HRTF reproduction object along with audio data on a predetermined number of personalized HRTF reproduction objects.

The transmission data piece D4 is transmission data that does not include audio data on personalized HRTF reproduction objects but includes only 2-ch mixed audio data on the common HRTF reproduction object.

The transmission data storage unit 155 in FIG. 17 stores the transmission data generated by the transmission data generation unit 154.

The transmission unit 156 communicates with the reproducing device 11 by controlling the communication unit 109 and transmits the transmission data stored in the transmission data storage unit 155 to the reproducing device 11. For example, transmission data corresponding to quality requested from the reproducing device 11 is transmitted from among transmission data on audio contents reproduced by the reproducing device 11. When the reproducing device 11 requests high quality, transmission data having a large number of personalized HRTF reproduction objects is transmitted.

The transmission data may be transmitted by downloading or streaming.

<Configuration of Reproducing Device 11>

Figure 19:
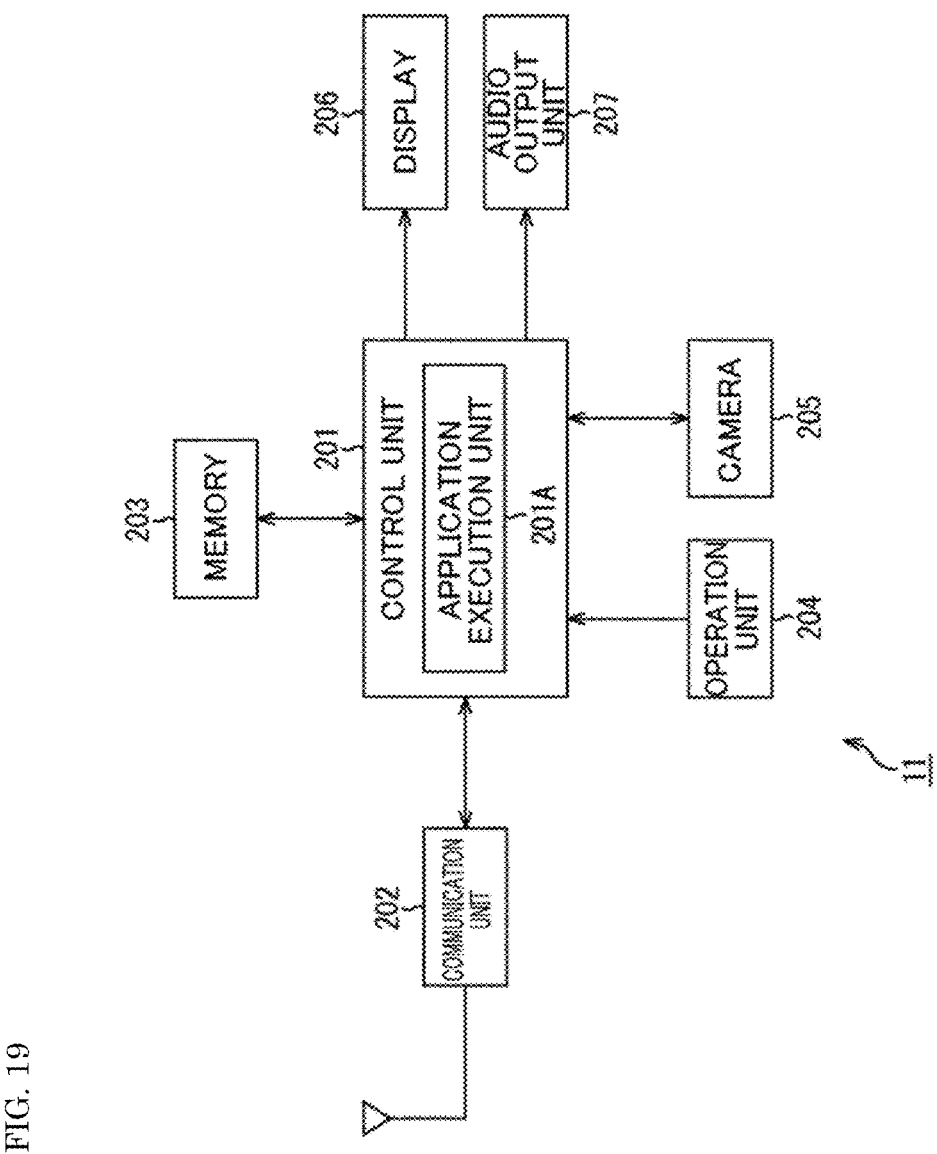
FIG. 19 is a block diagram illustrating a hardware configuration example of a reproducing device.

FIG. 19 is a block diagram illustrating a hardware configuration example of the reproducing device 11.

The reproducing device 11 is configured such that a communication unit 202, a memory 203, an operation unit 204, a camera 205, a display 206, and an audio output unit 207 are connected to a control unit 201.

The control unit 201 includes a CPU, a ROM, and a RAM. The control unit 201 controls an operation of the overall reproducing device 11 by executing a predetermined program.

In the control unit 201, an application execution unit 201A is implemented. Various applications (application programs) such as an application for reproducing audiobook contents are executed by the application execution unit 201A.

The communication unit 202 is a communication module that accommodates to radio communications of a mobile communication system, e.g., 5G communications. The communication unit 202 receives radio waves outputted from a base station and communicates with various devices such as the content management device 2 via the network 21. The communication unit 202 receives information transmitted from the content management device 2 and outputs the information to the control unit 201.

The memory 203 includes a flash memory. The memory 203 stores various kinds of information on applications to be executed by the control unit 201.

The operation unit 204 includes various buttons or a touch panel superimposed on the display 206. The operation unit 204 outputs information on the contents of a user operation to the control unit 201.

The camera 205 performs imaging in response to a user operation.

The display 206 includes an organic EL display or an LCD. Various screens including a screen of an application for reproducing audiobook contents are displayed on the display 206.

The audio output unit 207 transmits, to the headphones 12, audio data supplied from the control unit 201 through object audio processing or the like and outputs a sound of audiobook contents from the headphones 12.

Figure 20:
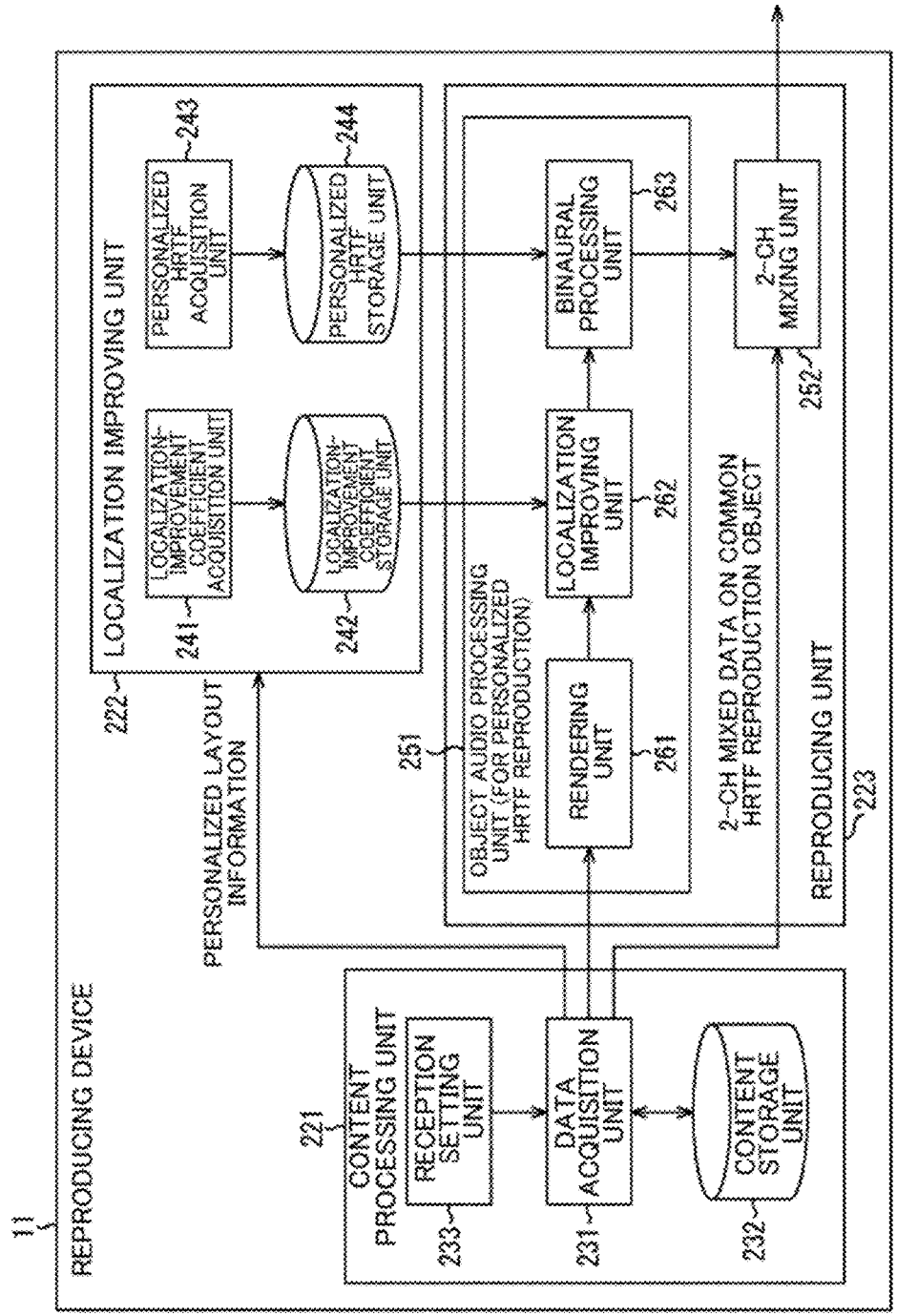
FIG. 20 is a block diagram illustrating a functional configuration example of the reproducing device.

FIG. 20 is a block diagram illustrating a functional configuration example of the reproducing device 11.

In the reproducing device 11, a content processing unit 221, a localization improving unit 222, and a reproducing unit 223 are implemented. At least some of the functional units illustrated in FIG. 20 are implemented by causing the application execution unit 201A in FIG. 19 to execute an application for reproducing audiobook contents.

The content processing unit 221 includes a data acquisition unit 231, a content storage unit 232, and a reception setting unit 233.

The data acquisition unit 231 communicates with the content management device 2 by controlling the communication unit 202 and acquires transmission data on audiobook contents.

For example, the data acquisition unit 231 transmits information on quality set by the reception setting unit 233 to the content management device 2 and acquires transmission data transmitted from the content management device 2. From the content management device 2, transmission data including audio data on personalized HRTF reproduction objects that increase in number according to the quality set by the reception setting unit 233. The transmission data acquired by the data acquisition unit 231 is outputted to the content storage unit 232 and is stored therein. The data acquisition unit 231 functions as a transmission data acquisition unit that acquires transmission data to be reproduced from a plurality of transmission data pieces prepared for the content management device 2 that is a transmission source device.

The data acquisition unit 231 outputs audio data on personalized HRTF reproduction objects included in the transmission data stored in the content storage unit 232, to an object audio processing unit 251 of the reproducing unit 223. Moreover, the data acquisition unit 231 outputs 2-ch mixed audio data on the common HRTF reproduction object to a 2-ch mixing unit 252. If audio data on personalized HRTF reproduction objects is included in the transmission data, the data acquisition unit 231 outputs, to the localization improving unit 222, personalized layout information included in the object metadata of the transmission data.

The reception setting unit 233 sets, for example, the quality of transmission data to be requested from the content management device 2 and outputs information on the set quality to the data acquisition unit 231. The quality of transmission data to be requested from the content management device 2 is set by, for example, a user.

The localization improving unit 222 includes a localization-improvement coefficient acquisition unit 241, a localization-improvement coefficient storage unit 242, a personalized HRTF acquisition unit 243, and a personalized HRTF storage unit 244.

The localization-improvement coefficient acquisition unit 241 acquires a localization improvement coefficient used for improving localization, on the basis of a speaker layout indicated in personalized layout information supplied from the data acquisition unit 231. The localization improvement coefficient is also acquired, as appropriate, on the basis of a listening position selected by the user.

For example, information used for reverberating is acquired as the localization improvement coefficient. The localization improvement coefficient acquired by the localization-improvement coefficient acquisition unit 241 is outputted to the localization-improvement coefficient storage unit 242 and is stored therein.

The personalized HRTF acquisition unit 243 acquires a personalized HRTF corresponding to the listening position of the user, on the basis of the personalized layout information supplied from the data acquisition unit 231. The personalized HRTF is acquired from, for example, an external device that provides the personalized HRTF. The external device that provides the personalized HRTF may be the content management device 2 or a device different from the content management device 2.

For example, the personalized HRTF acquisition unit 243 controls the camera 205 and acquires an ear image obtained by imaging an ear of the user serving as a listener. By controlling the communication unit 202, the personalized HRTF acquisition unit 243 transmits the personalized layout information and the ear image to the external device and then receives and acquires a personalized HRTF that is transmitted in response to the transmission of the personalized layout information and the ear image. The personalized HRTF that is acquired by the personalized HRTF acquisition unit 243 and corresponds to the listening position is outputted to the personalized HRTF storage unit 244 and is stored therein.

Figure 21:
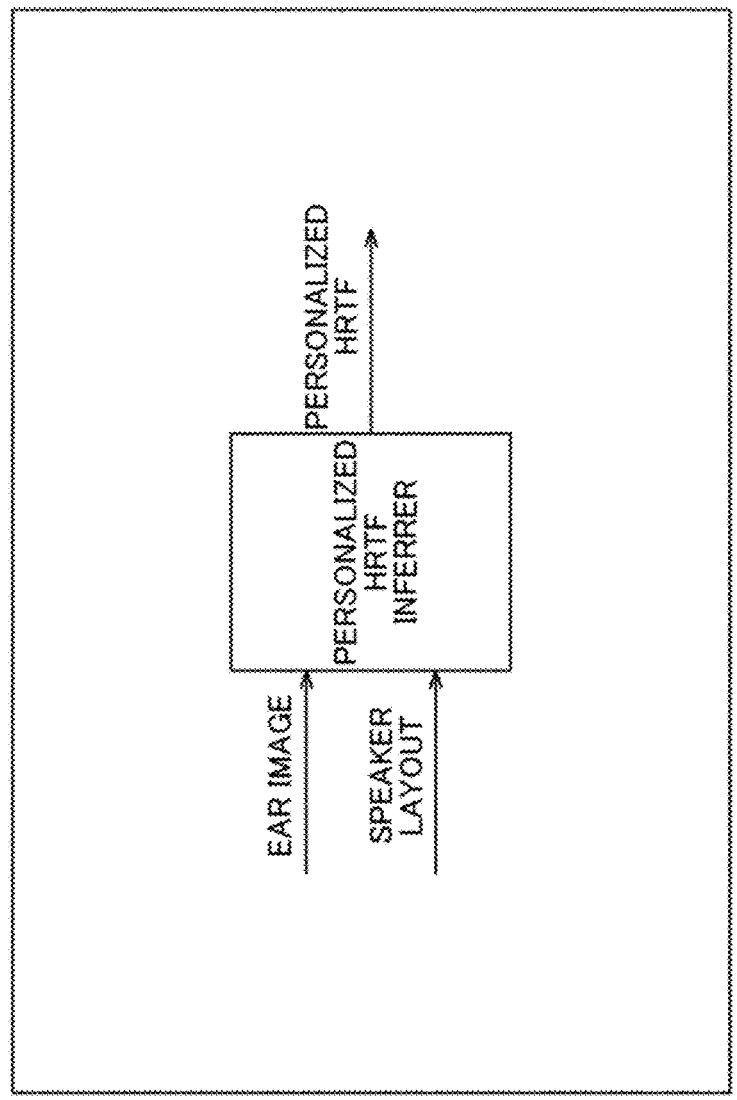
FIG. 21 illustrates an example of an inference model.

FIG. 21 illustrates an example of an inference model provided for the external device.

As illustrated in FIG. 21, for the external device that provides the personalized HRTF, a personalized HRTF inferrer is prepared to receive, as inputs, information on the speaker layout indicated in the personalized layout information and the ear image and output the personalized HRTF.

The personalized HRTF inferrer is, for example, an inference model generated by performing machine learning using learning data that is a set of HRTFs measured through speakers in various layouts including the layout of FIG. 7 and the ear images of a measurer. In the external device, the personalized HRTF is inferred on the basis of the personalized layout information transmitted from the reproducing device 11 and the ear images, and the inference result is transmitted to the reproducing device 11.

For example, the personalized HRTF corresponding to the listening position is acquired by correcting, according to the listening position, the HRTF obtained as the inference result of the personalized HRTF inferrer. Information on the listening position may be inputted to the personalized HRTF inferrer, and the HRTF outputted from the personalized HRTF inferrer may be directly used as the personalized HRTF corresponding to the listening position.

The personalized HRTF inferrer may be prepared in the reproducing device 11. In this case, the personalized HRTF is inferred by the personalized HRTF acquisition unit 243 using the ear image and the personalized layout information.

The reproducing unit 223 in FIG. 20 includes the object audio processing unit 251 and the 2-ch mixing unit 252.

The object audio processing unit 251 performs object audio processing including rendering and binaural processing on audio data on the personalized HRTF reproduction object supplied from the data acquisition unit 231.

As described above, the object audio processing on the common HRTF reproduction object is performed in the content management device 2, whereas the object audio processing on the personalized HRTF reproduction object is performed in the reproducing device 11.

The object audio processing unit 251 includes a rendering unit 261, a localization improving unit 262, and a binaural processing unit 263.

The rendering unit 261 performs rendering on the personalized HRTF reproduction object on the basis of position information and outputs audio data obtained by rendering to the localization improving unit 262. Rendering such as VBAP is performed by the rendering unit 261 on the basis of audio data on the personalized HRTF reproduction object.

The localization improving unit 262 reads the localization improvement coefficient from the localization-improvement coefficient storage unit 242 and performs localization improvement such as reverberating on audio data supplied from the rendering unit 261. The localization improving unit 262 outputs audio data on objects obtained by localization improvement, to the binaural processing unit 263. The localization improvement by the localization improving unit 262 can be avoided.

The binaural processing unit 263 reads and acquires the personalized HRTF from the personalized HRTF storage unit 244. The binaural processing unit 263 performs binaural processing using the personalized HRTF on the audio data on objects supplied from the localization improving unit 262 and outputs an audio signal obtained by the binaural processing.

The 2-ch mixing unit 252 performs 2-ch mixing on the basis of 2-ch mixed audio data on the common HRTF reproduction object supplied from the data acquisition unit 231 and the audio signal supplied from the binaural processing unit 263.

By performing 2-ch mixing, the audio signal L and the audio signal R that include the audio component of the personalized HRTF reproduction object and the audio component of the common HRTF reproduction object are generated. The 2-ch mixing unit 252 outputs 2-ch mixed audio data that is obtained by 2-ch mixing to the audio output unit 207 and outputs the sounds of the objects of audiobook contents from the headphones 12.

<<Operation of Each Device>>

The operations of the devices configured thus will be described below.

<Operation of Content Production Device 1>

Figure 22:
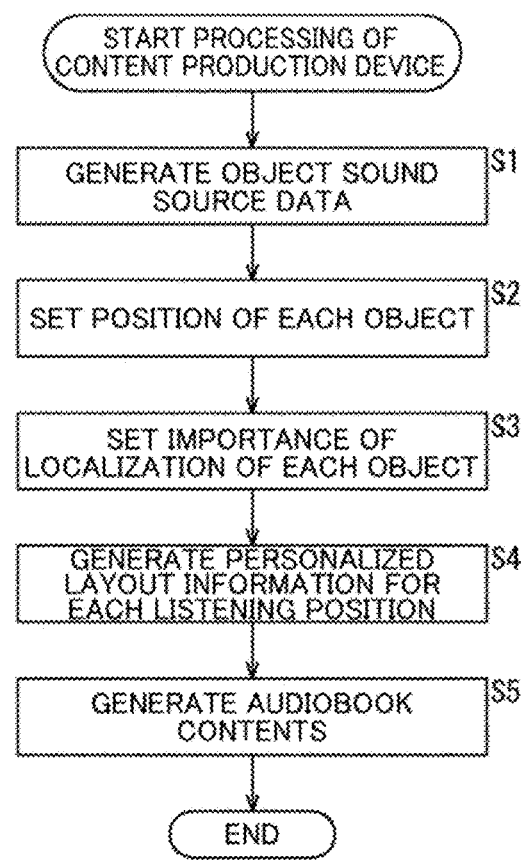
FIG. 22 is a flowchart for explaining the processing of the content production device.

Referring to the flowchart of FIG. 22, the processing of the content production device 1 will be described below.

In step S1, the object sound-source data generation unit 122 generates sound source data on each object.

In step S2, the position information generation unit 131 sets the position of each object in response to an operation of a producer and generates position information.

In step S3, the localization-importance information generation unit 132 sets the importance of localization of each object in response to an operation of the producer and generates localization importance information.

In step S4, the personalized layout information generation unit 133 generates personalized layout information for each listening position.

In step S5, the content generation unit 121 generates audiobook contents by linking object sound source data generated by the object sound-source data generation unit 122 and object metadata that includes position information generated by the position information generation unit 131.

The processing is performed for each title of the audiobook contents.

Since object audio data is included as audio data on audiobook contents, the producer can produce more realistic audiobook contents as compared with recording of a voice narration of a book as a stereo sound.

Typically, the importance of localization varies among objects. The producer can set the importance of localization for each object and specify whether each object is to be reproduced using the personalized HRTF or the common HRTF.

<Operation of Content Management Device 2>

Figure 23:
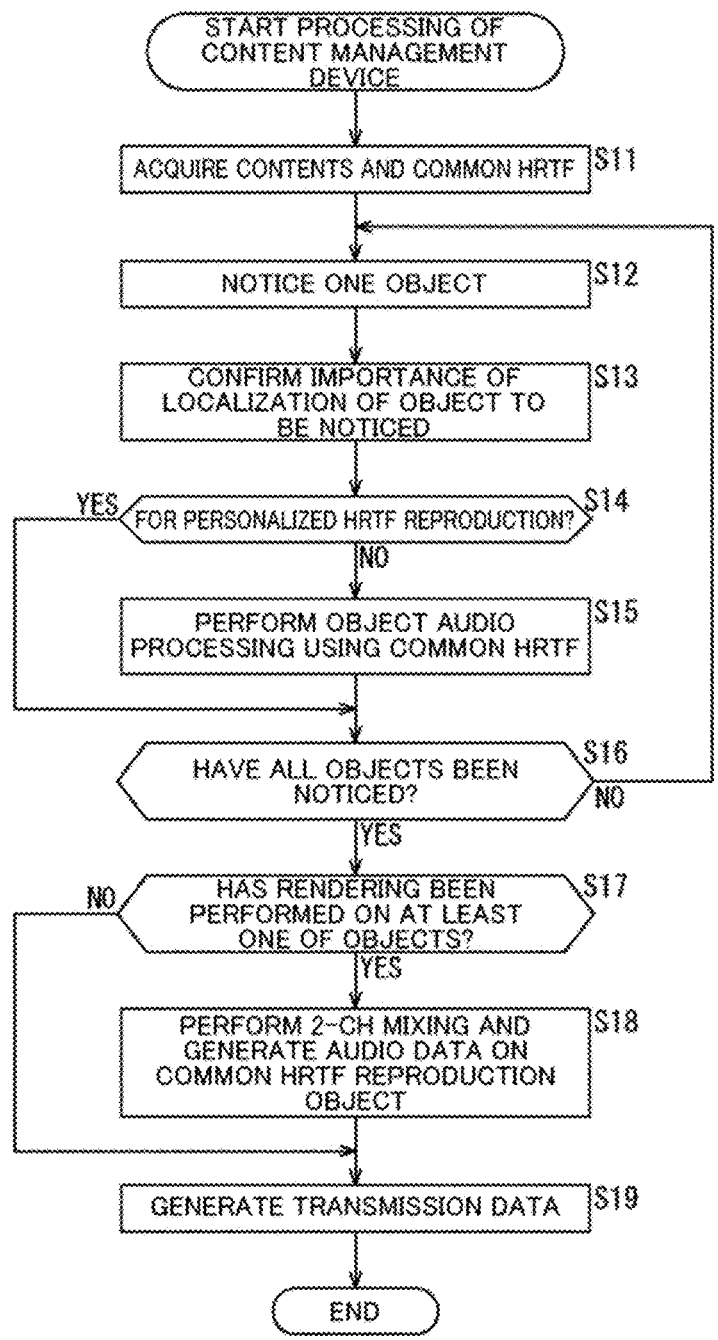
FIG. 23 is a flowchart for explaining the processing of the content management device.

Referring to the flowchart of FIG. 23, the processing of the content management device 2 will be described below.

In step S11, the content/common HRTF acquisition unit 151 acquires audiobook contents and the common HRTF.

In step S12, the content/common HRTF acquisition unit 151 notices one of objects constituting the audiobook contents.

In step S13, the content/common HRTF acquisition unit 151 confirms the importance of localization the object to be noticed, on the basis of the localization importance information.

In step S14, the content/common HRTF acquisition unit 151 determines whether the object to be noticed is to be reproduced as the personalized HRTF reproduction object.

Whether the object to be noticed is to be reproduced as the personalized HRTF reproduction object is determined by comparing a value indicating the importance of localization of the object to be noticed and a threshold value. For example, if a value indicating the importance of localization of the object to be noticed is equal to or greater than the threshold value, it is determined that the object is to be reproduced as the personalized HRTF reproduction object.

If it is determined that the object is not to be reproduced as the personalized HRTF reproduction object, that is, the object to be noticed is to be reproduced as the personalized HRTF reproduction object in step S14, the processing advances to step S15.

In step S15, the object audio processing unit 152 performs object audio processing on audio data on the common HRTF reproduction object supplied from the content/common HRTF acquisition unit 151. The object audio processing on the audio data on the common HRTF reproduction object is performed by using the common HRTF.

If it is determined that the object to be noticed is to be reproduced as the personalized HRTF reproduction object in step S14, the processing of step S15 is skipped.

In step S16, the content/common HRTF acquisition unit 151 determines whether all the objects constituting the audiobook contents have been noticed.

If it is determined that at least one of the objects has not been noticed in step S16, the processing returns to step S12 to notice another object. The foregoing processing is repeatedly performed.

If it is determined that all the objects have been noticed in step S16, the 2-ch mixing unit 153 determines whether rendering has been performed on at least one of the objects in step S17.

If it is determined that rendering has been performed on at least one of the objects in step S17, in step S18, the 2-ch mixing unit 153 performs 2-ch mixing on the audio signal generated on the basis of the audio data on the common HRTF reproduction object. The 2-ch mixed audio data on the common HRTF reproduction object is supplied to the transmission data generation unit 154, the 2ch-mixed audio data being obtained by 2-ch mixing.

If it is determined that no object has been subjected to rendering in step S17, the processing of step S18 is skipped.

In step S19, the transmission data generation unit 154 generates transmission data by linking the audio data on the personalized HRTF reproduction object and the 2-ch mixed audio data on the common HRTF reproduction object. In the absence of the common HRTF reproduction object, transmission data including only the audio data on the personalized HRTF reproduction object is generated. In this way, transmission data including only the audio data on the personalized HRTF reproduction object may be generated.

The processing is repeated while changing a threshold value serving as a criterion for determining whether an object is to be reproduced as the personalized HRTF reproduction object, so that a plurality of transmission data pieces with different numbers of personalized HRTF reproduction objects are generated and prepared in the content management device 2.

For an object requiring the importance of localization, object audio is transmitted as it is, so that the content management device 2 can cause the reproducing device 11 to perform object audio processing using the personalized HRTF.

If all the objects are transmitted as object audio, object audio processing may be improperly performed in the reproducing device 11 depending upon the performance or communication environment of the reproduction side. Object audio processing on some objects that do not require the importance of localization is performed in the content management device 2, so that the content management device 2 can provide transmission data according to, for example, the performance of the reproducing device 11 and cause the reproducing device 11 to perform proper processing.

<Operation of Reproducing Device 11>

Figure 24:
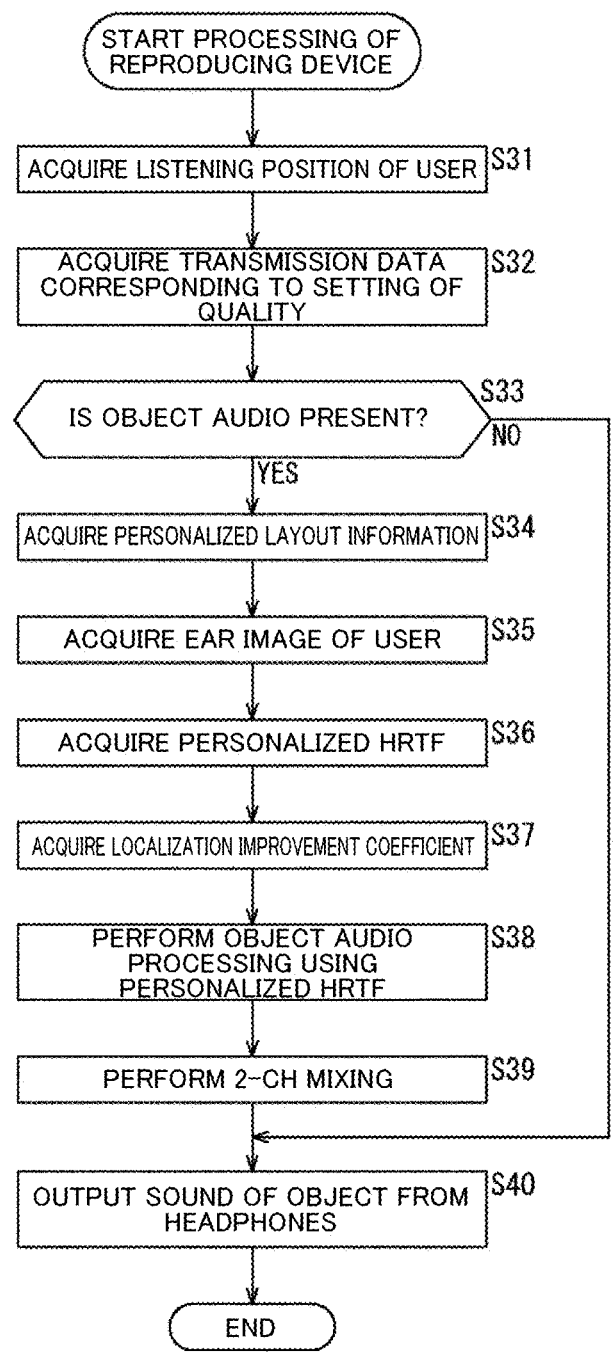
FIG. 24 is a flowchart for explaining the processing of the reproducing device.

Referring to the flowchart of FIG. 24, the processing of the reproducing device 11 will be described below.

In step S31, the localization improving unit 222 acquires the listening position of a user. The listening position of the user is acquired by, for example, user selection on the screen of an application for reproducing audiobook contents. The listening position of the user may be acquired by analyzing the position of the user on the basis of sensor data.

In step S32, the data acquisition unit 231 acquires transmission data corresponding to the setting of quality from among transmission data prepared in the content management device 2.

In step S33, the data acquisition unit 231 determines whether the acquired transmission data includes audio data on the personalized HRTF reproduction object.

If it is determined that audio data on the personalized HRTF reproduction object is included in step S33, in step S34, the data acquisition unit 231 acquires personalized layout information included in the object metadata of the transmission data.

In step S35, the personalized HRTF acquisition unit 243 controls the camera 205 and acquires an ear image obtained by imaging an ear of the user. The ear image is imaged in response to, for example, a user operation. The user captures an image of an ear of the user with the camera 205 of the reproducing device 11 before listening to audiobook contents.

In step S36, the personalized HRTF acquisition unit 243 acquires a personalized HRTF on the basis of personalized layout information and the ear image.

In step S37, the localization improving unit 222 acquires a localization improvement coefficient used for improving localization, on the basis of a speaker layout or the like indicated in the personalized layout information.

In step S38, the object audio processing unit 251 performs object audio processing on the audio data on the personalized HRTF reproduction object by using the personalized HRTF.

In step S39, the 2-ch mixing unit 252 performs 2-ch mixing on the basis of 2-ch mixed audio data on the common HRTF reproduction object and the audio signal of the personalized HRTF reproduction object, the audio signal being obtained by object audio processing.

In step S40, the 2-ch mixing unit 252 outputs 2-ch mixed audio data that is obtained by 2-ch mixing and outputs the sounds of the objects of audiobook contents from the headphones 12. The sounds outputted from the headphones 12 include the sound of the personalized HRTF reproduction object and the sound of the common HRTF reproduction object.

In step S33, if it is determined that audio data on the personalized HRTF reproduction object is not included in the transmission data, the processing of steps S34 to S39 is skipped. The transmission data only includes the 2-ch mixed audio data on the common HRTF reproduction object.

In this case, in step S40, the sound of the common HRTF reproduction object is outputted on the basis of the 2-ch mixed audio data on the common HRTF reproduction object, the 2-ch mixed audio data being included in the transmission data.

The processing allows the reproducing device 11 to localize the sound image of each object around the user.

An object requiring the importance of localization is reproduced by using an HRTF personalized for the user, allowing the reproducing device 11 to localize a sound image with high accuracy.

If object audio processing on all the objects is performed in the content management device 2, the reproducing device 11 cannot change the localization of the objects. Object audio processing for some objects requiring the importance of localization is performed on the reproduction side, so that the reproducing device 11 can change the localization of the objects by performing reproduction using the HRTF personalized for the user.

The user can obtain realism in contrast to listening to a sound having not undergone stereoscopic sound processing.

Furthermore, object audio processing for some objects that do not require the importance of localization is performed in the content management device 2, thereby reducing the load of processing of the reproducing device 11. Typically, loads such as a computational resource, battery exhaustion, and a measure against heat increase with the number of objects. Moreover, as the number of objects increases, the reproducing device 11 needs a larger storage capacity for storing the coefficients of personalized HRTFs.

In other words, the reproducing device 11 can provide realistic audiobook contents while reducing a load of processing.

Modifications

Modification 1: Transmission Data Preparation on Production Side

Transmission data may be generated in the content production device 1. In this case, from among the configurations of the content management device 2, the configuration for generating transmission data is provided for the content production device 1.

Figure 25:
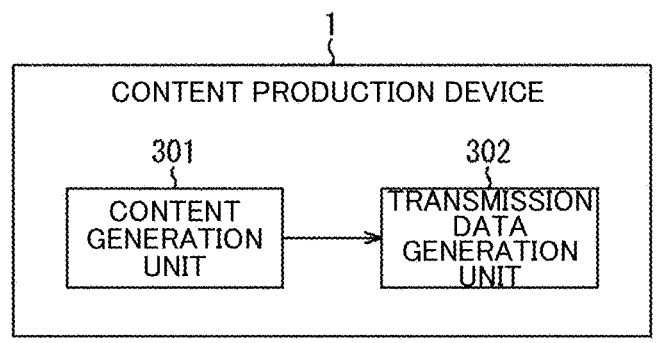
FIG. 25 is a block diagram illustrating another configuration example of the content production device.

FIG. 25 is a block diagram illustrating another configuration example of the content production device 1.

The content production device 1 in FIG. 25 includes a content generation unit 301 and a transmission data generation unit 302.

The content generation unit 301 includes the configurations described with reference to FIG. 15.

From among the configurations of the content management device 2 described with reference to FIG. 17, the transmission data generation unit 302 is provided with at least the content/common HRTF acquisition unit 151, the object audio processing unit 152, the 2-ch mixing unit 153, and the transmission data generation unit 154 that are configurations for generating transmission data. Transmission data configured by the transmission data generation unit 302 is provided for the content management device 2.

The transmission unit 156 (FIG. 17) of the content management device 2 selects transmission data with predetermined quality from the transmission data generated by the content production device 1 and transmits the transmission data to the reproducing device 11.

Modification 2: Selection Example of Transmission Data

Information on quality is transmitted from the reproducing device 11 to the content management device 2, and transmission data corresponding to the quality requested from the reproducing device 11 is selected by the content management device 2. Transmission data to be transmitted may be selected on the basis of another criterion.

In this case, information on network environments such as a throughput between the content management device 2 and the reproducing device 11, the device configuration of the reproduction side, and the processing performance of the reproducing device 11 is transmitted from the reproducing device 11 to the content management device 2. In the content management device 2, transmission data corresponding to, for example, the network environment is selected on the basis of the information transmitted from the reproducing device 11 and is transmitted to the reproducing device 11.

Modification 3: Selection Example of Transmission Data

Figure 26:
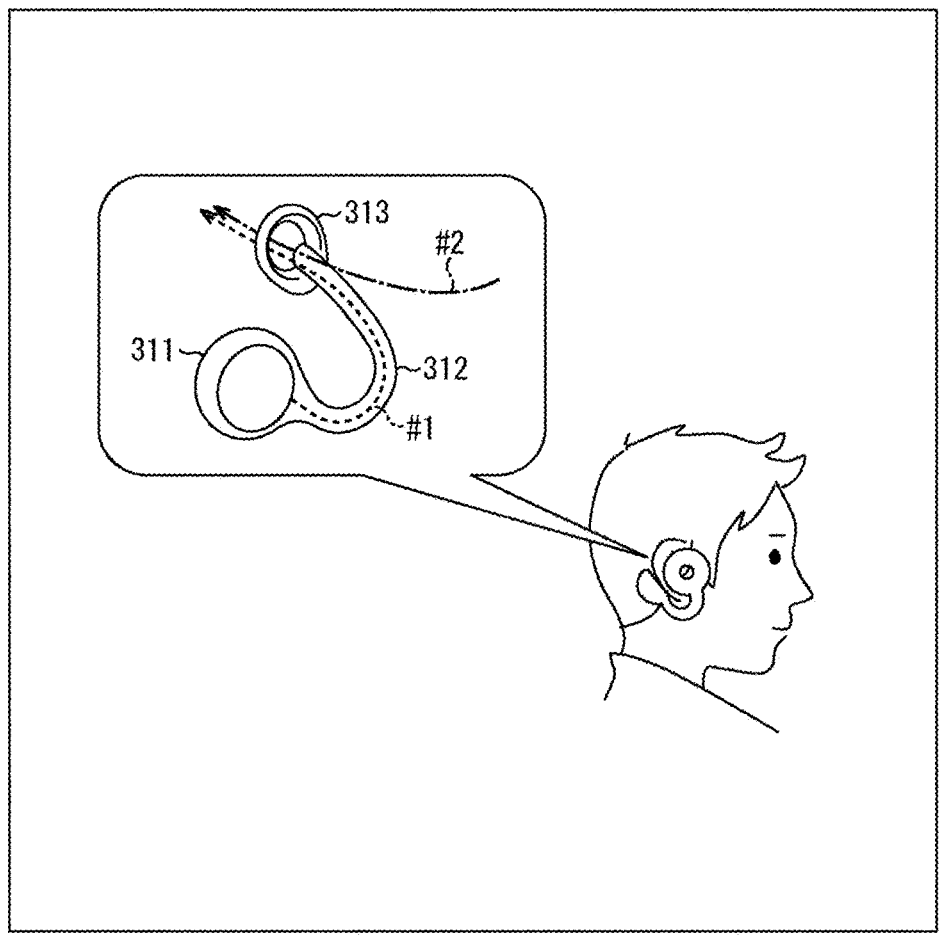
FIG. 26 illustrates the appearance of an earphone having the function of collecting external sounds.

The user wears the headphones 12 as a device. Instead of the headphones 12, earphones capable of collecting external sounds may be used as illustrated in FIG. 26. In this case, audiobook contents are heard in a hybrid style that is a combination of the earphones and a speaker (real speaker) provided on the reproduction side.

FIG. 26 illustrates the appearance of the earphones having the function of collecting external sounds.

The earphones in FIG. 26 are so-called open-ear (open-type) earphones that do not close earholes.

As enlarged in a balloon in FIG. 26, the right unit of the earphones includes a driver unit 311 and a ring-shaped mounting part 313 that are joined to each other via a U-shaped sound conduit 312. The right unit is mounted by pressing the mounting part 313 around the outer earhole such that the right ear is held between the mounting part 313 and the driver unit 311.

The left unit has the same configuration as the right unit. The left unit and the right unit have a wired or wireless connection.

The driver unit 311 of the right unit receives an audio signal transmitted from the reproducing device 11 and outputs a sound from the tip of the sound conduit 312 as indicated by an arrow #1, the sound corresponding to the audio signal. A hole for outputting sound to the outer earhole is formed at the junction of the sound conduit 312 and the mounting part 313.

The mounting part 313 is shaped like a ring. Along with a content sound outputted from the tip of the sound conduit 312, an ambient sound also reaches the outer earhole as indicated by an arrow #2.

Figure 27:
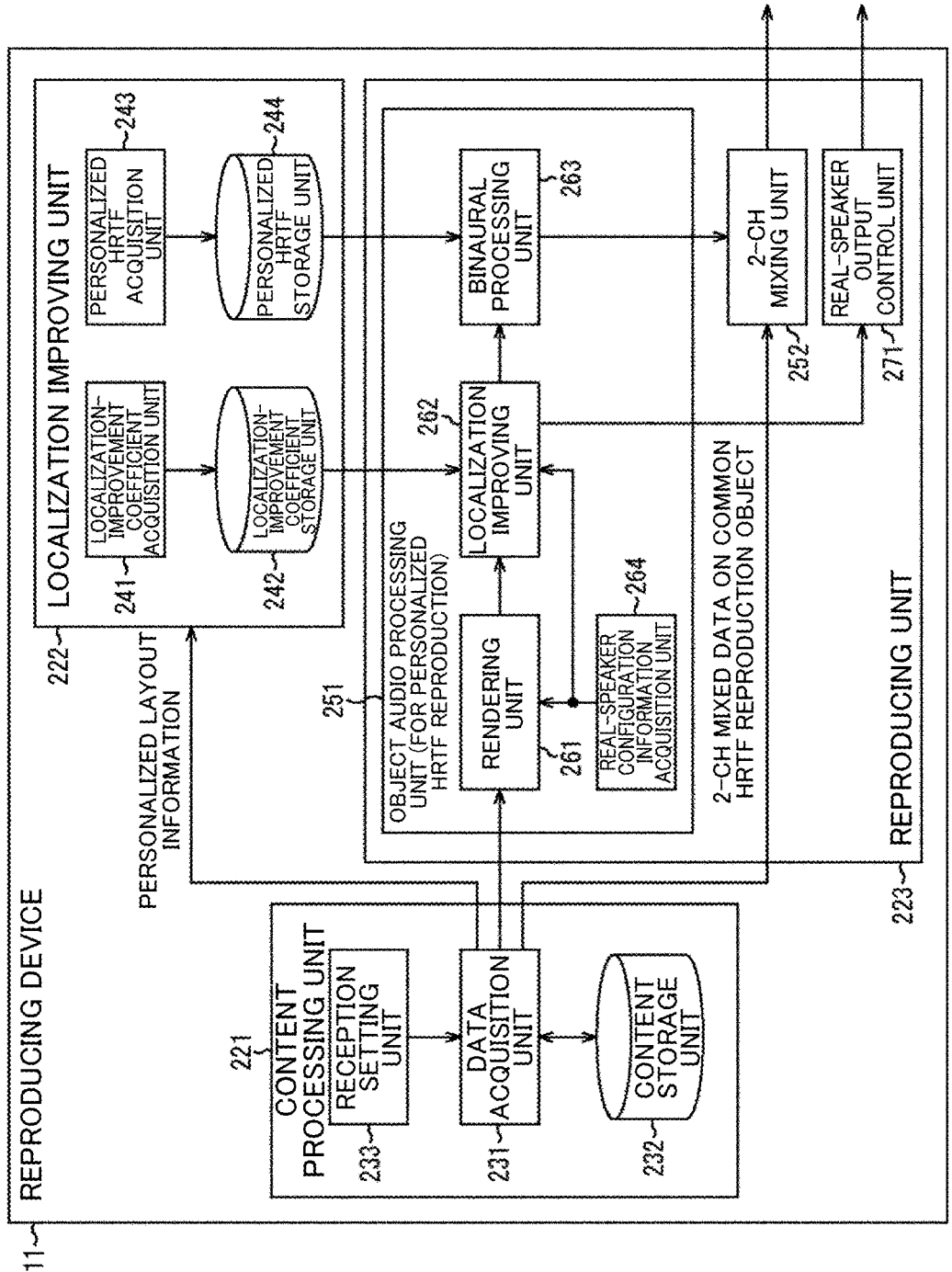
FIG. 27 is a block diagram illustrating another configuration example of the reproducing device.

FIG. 27 is a block diagram illustrating a configuration example of the reproducing device 11 when audiobook contents are heard in the hybrid style.

Among configurations illustrated in FIG. 27, the same configurations as those described with reference to FIG. 20 are denoted by the same reference characters. The repeated description will be omitted as appropriate. The same applies to FIG. 28, which will be described later.

The configuration of the reproducing device 11 in FIG. 27 is different from the configuration of FIG. 20 in that the object audio processing unit 251 is additionally provided with a real-speaker configuration information acquisition unit 264 and the reproducing unit 223 additionally includes a real-speaker output control unit 271.

The real-speaker configuration information acquisition unit 264 acquires reproduction-speaker configuration information that is information on the configuration of a real speaker provided on the reproduction side. The reproduction-speaker configuration information includes, for example, information on the layout of real speakers. The layout of real speakers indicated by the reproduction-speaker configuration information may be identical to or different from the speaker layout indicated in the personalized layout information. The reproduction-speaker configuration information acquired by the real-speaker configuration information acquisition unit 264 is outputted to the rendering unit 261 and the localization improving unit 262.

In the rendering unit 261, predetermined ones of personalized HRTF reproduction objects are allocated to the real speakers, other objects are allocated to the earphones, and then rendering is performed. Which one of the objects is to be allocated to the speaker/earphones may be selected on the basis of a distance from the object to the listener or the localization importance information.

Audio data obtained by rendering is subjected to localization improvement in the localization improving unit 262. In the localization improvement, for example, reverberating is performed according to the layout of the real speakers. Among the audio data obtained by the localization improvement, audio data on the object allocated to the real speaker is supplied to the real-speaker output control unit 271 and audio data on the object allocated to the earphones is supplied to the binaural processing unit 263.

The real-speaker output control unit 271 generates audio signals with channels as many as the number of real speakers according to the allocation by the rendering unit 261 and outputs, from the respective real speakers, the sounds of the objects allocated to the real speakers.

The sound of the object allocated to the earphones is outputted from the earphones after 2-ch mixing is performed, allowing the user to listen to the sound from the earphones as well as the sounds from the real speakers. In this way, audiobook contents can be heard in a hybrid style that is a combination of the earphones and the real speakers.

Audiobook contents may be heard only through real speakers without using the headphones 12 or earphones.

Modification Example 4: Example of Head Tracking

When a user listens to audiobook contents, so-called head tracking may be performed to correct an HRTF according to the head orientation of the user. In the headphones 12, sensors such as a gyroscope sensor and an acceleration sensor are installed.

Figure 28:
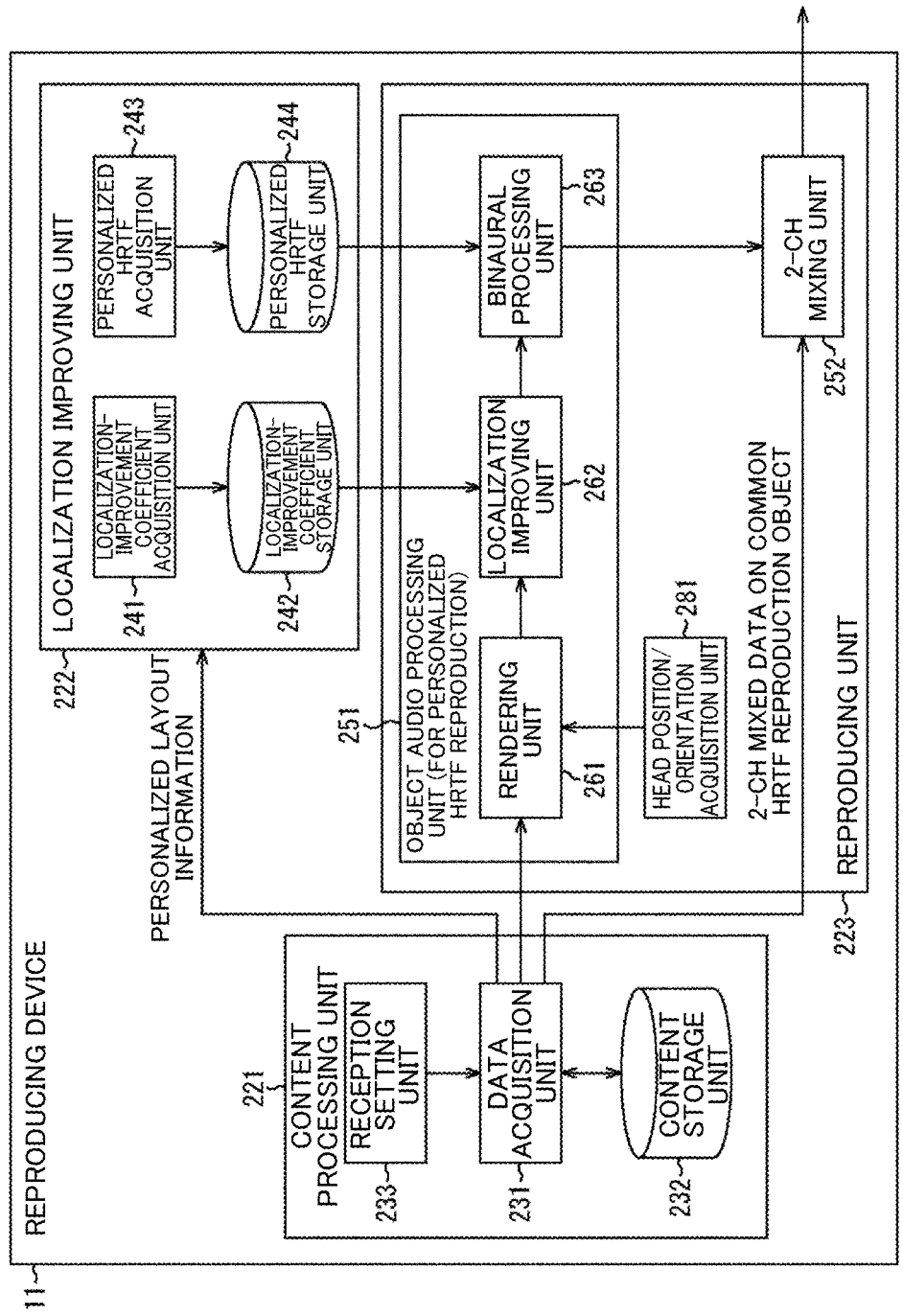
FIG. 28 is a block diagram illustrating another configuration example of the reproducing device.

FIG. 28 is a block diagram illustrating another configuration example of the reproducing device 11.

The configuration of the reproducing device 11 in FIG. 28 is different from the configuration of FIG. 20 in that the reproducing unit 223 is additionally provided with a head position/orientation acquisition unit 281.

The head position/orientation acquisition unit 281 detects the head position and orientation of the user on the basis of sensor data detected by the sensors installed in the headphones 12. Information on the head position and orientation that are detected by the head position/orientation acquisition unit 281 is outputted to the rendering unit 261.

On the basis of the head position and orientation that are detected by the head position/orientation acquisition unit 281, the rendering unit 261 corrects object positions indicated by position information so as to fix the absolute positions of objects. For example, if the head of the user rotates 30° to the right with respect to a certain direction, the rendering unit 261 rotates the positions of all the objects 30° to the left, thereby correcting the positions of the objects.

In the localization improving unit 262 and the binaural processing unit 263, for example, processing corresponding to the corrected positions is performed on audio data on the respective personalized HRTF reproduction objects.

In this way, head tracking is performed when audiobook contents are heard, allowing the reproducing device 11 to localize the sound image of each object at a fixed position without being affected by a motion of the head of the user.

Modification Example 5: Determination Example of Importance of Localization

The importance of localization of each object is manually set by the producer. The importance of localization may be automatically set by the content production device 1.

Figure 29:
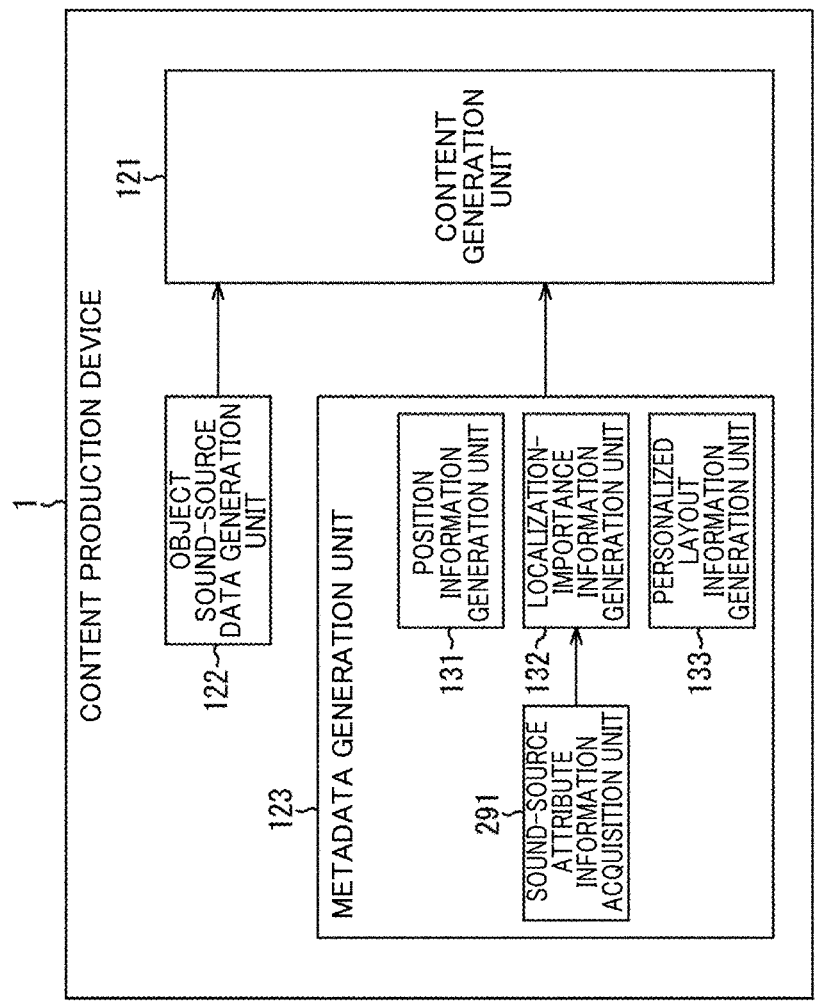
FIG. 29 is a block diagram illustrating another configuration example of the content production device.

FIG. 29 is a block diagram illustrating another configuration example of the content production device 1.

Among configurations illustrated in FIG. 29, the same configurations as those described with reference to FIG. 15 are denoted by the same reference characters. The repeated description will be omitted as appropriate.

The configuration of the content production device 1 in FIG. 29 is different from the configuration of FIG. 15 in that the metadata generation unit 123 is additionally provided with a sound-source attribute information acquisition unit 291.

The sound-source attribute information acquisition unit 291 acquires attribute information on sound source data on objects. The attribute information includes, for example, the file name of a file for storing the sound source data, file contents such as the kind of sound source data, and information estimated from the file name and file contents. The attribute information acquired by the sound-source attribute information acquisition unit 291 is outputted to the localization-importance information generation unit 132.

The localization-importance information generation unit 132 sets the importance of localization of each object on the basis of the attribute information supplied from the sound-source attribute information acquisition unit 291.

For example, the kind of sound source data (including a sound effect and a voice) on each object is specified on the basis of the attribute information. In the case of automatic setting with an emphasized sound effect, a high value is set as a value indicating the importance of localization for the object of the sound effect. In the case of automatic setting with an emphasized voice, a high value is set as a value indicating the importance of localization for the object of the voice.

In this way, the importance of localization is automatically set, thereby reducing the load of production of audiobook contents.

Other Examples

<Example of Allocation of Processing>

Object audio processing for the common HRTF reproduction object as well as the personalized HRTF reproduction object may be performed in the reproducing device 11. In this case, audio data on the common HRTF reproduction object is transmitted as it is with audio data on the personalized HRTF reproduction object, from the content management device 2 to the reproducing device 11.

The reproducing device 11 acquires the common HRTF and performs object audio processing on the common HRTF reproduction object. Moreover, the reproducing device 11 acquires the personalized HRTF and performs object audio processing on the personalized HRTF reproduction object.

Also in this case, the reproducing device 11 can provide realistic audiobook contents.

<Example of Switching of Objects>

The personalized HRTF reproduction object and the common HRTF reproduction object may be dynamically switched. In this case, reproduction as the personalized HRTF reproduction object and reproduction as the common HRTF reproduction object are dynamically switched for each object.

For example, in the case of a poor network environment between the content management device 2 and the reproducing device 11 or a large load of processing in the reproducing device 11, many objects are selected as common HRTF reproduction objects. In the case of a proper network environment between the content management device 2 and the reproducing device 11 or a small load of processing in the reproducing device 11, many objects are selected as personalized HRTF reproduction objects.

The personalized HRTF reproduction object and the common HRTF reproduction object may be switched according to whether to transmit audiobook contents by streaming or downloading.

A flag indicating the priority of processing may be set for each object instead of a flag indicating the importance of localization.

Alternatively, instead of a flag indicating the importance of localization, a flag may be set to directly indicate whether to reproduce an object as the personalized HRTF reproduction object or the common HRTF reproduction object.

In this way, the personalized HRTF reproduction object and the common HRTF reproduction object can be switched on the basis of various kinds of information specified by the production side.

<Example of Interaction>

Acquisition of HRTF

The personalized HRTF is acquired on the basis of an ear image or the like. The personalized HRTF may be acquired according to user interaction.

Acquisition Example 1 of Personalized HRTF

For example, if a space including speakers disposed as illustrated in FIG. 7 is prepared on the reproduction side, the user as a measurer may be seated at the center of the speakers to measure the personalized HRTF.

Acquisition Example 2 of Personalized HRTF

The personalized HRTF may be measured by identifying the direction of sound in, for example, a game format. For example, a reaction is shown when the sound of an insect is heard in front of the user.

Acquisition Example 3 of Personalized HRTF

If a plurality of personalized HRTF samples are prepared, the user may be caused to listen to a sound reproduced by using each of the samples and select, according to the feeling of localization, which one of the samples is to be used. The sample selected by the user is used as the personalized HRTF when the user listens to audiobook contents.

The personalized HRTF may be corrected according to response in a game format, response about the reselection of the sample, or user response during viewing of contents.

The personalized HRTF may be acquired with a combination of the acquisition of the personalized HRTF in a game format and the acquisition of the personalized HRTF using the sample.

In this case, for example, calculated as a localization error with respect to the position of the user is an angle difference between the direction of the position of an object indicated by position information and the direction of a position where the user feels localization of a sound image. A localization error is repeatedly calculated while switching samples, and the sample having a small localization error is selected as a personalized HRTF to be actually used.

The personalized HRTF may be acquired according to the foregoing method when the user listens to audiobook contents, and reproduction using the personalized HRTF may be performed when the personalized HRTF is acquired. In this case, for example, each object is reproduced as the common HRTF reproduction object in the first half of audiobook contents, and a predetermined object is reproduced as the personalized HRTF reproduction object in the second half.

The personalized HRTF may be acquired by calculation based on information on an ear size or a head circumference instead of an ear image.

Content Reproduction

The user may perform operations for reproduction when audiobook contents are reproduced.

The operations for reproduction include, for example, the selection of zoom in/out for a sound source (object) to be immersive, the selection of turn on/off of a sound effect, the specification of a narration position, switching of languages, the presence or absence of the foregoing head tracking, and the selection of a story.

Others

The foregoing processing is applicable to various contents including object audio data, for example, music contents, radio contents, movie contents, and the contents of television programs.

Configuration Example of Computer

The above-mentioned series of processing can be executed by hardware or software. When the series of processing is executed by software, a program constituting the software is installed from a program recording medium onto a computer built in dedicated hardware or a general-purpose personal computer.

The program to be installed is provided after being recorded in the removable medium 111 illustrated in FIG. 14, the removable medium 111 including an optical disc (CD-ROM (Compact Disc-Read Only Memory), a DVD (Digital Versatile Disc) or the like) and a semiconductor memory. In addition, the program may be provided through wired or wireless transmission media such as a local area network, the Internet, and digital broadcasting. The program can be installed in the ROM 102 or the storage unit 108 in advance.

The program executed by the computer may be a program that performs processing in time series in the order described in the present specification or may be a program that performs processing in parallel or at a necessary timing, for example, when a call is made.

In the present specification, a system means a set of a plurality of constituent elements (devices, modules (components) or the like) regardless of whether all the constituent elements are located in the same casing. Accordingly, a plurality of devices stored in separate casings and connected via a network and a single device including a plurality of modules stored in a casing are both systems.

Also, the advantageous effects described in the present specification are merely exemplary and are not intended as limiting, and other advantageous effects may be obtained.

The embodiments of the present technique are not limited to the foregoing embodiments, and various changes can be made without departing from the gist of the present technique.

For example, the present technique may be configured as cloud computing in which a plurality of devices share and cooperatively process one function via a network.

In addition, each step described in the above flowcharts can be executed by one device or executed in a shared manner by a plurality of devices.

Furthermore, in the case where one step includes a plurality of processes, the plurality of processes included in the one step can be executed by one device or executed in a shared manner by a plurality of devices.

<Combination Example of Configurations>

The present technique can also have the following configuration:

(1)

A reproducing device including a reproducing unit configured to reproduce object audio contents including a first object reproduced by using a personalized HRTF that is an HRTF personalized for a listener, and a second object reproduced by using a common HRTF that is an HRTF shared among a plurality of listeners.

(2)

The reproducing device according to (1), further including an HRTF acquisition unit configured to acquire the personalized HRTF on the basis of an image of a listener's ear and layout information on the layout of speakers when the common HRTF is measured, the layout information being included in the contents.

(3)

The reproducing device according to (1) or (2), wherein transmission data on the contents includes audio data on the first object and channel-base data generated in a transmission source device of the contents by performing processing using the common HRTF on audio data on the second object.

(4) The reproducing device according to (3), wherein the reproducing unit outputs a sound corresponding to channel-base data generated by performing processing using the personalized HRTF on audio data on the first object and the channel-base data included in the transmission data.

(5)

The reproducing device according to (1) or (2), wherein the reproducing unit performs processing using the personalized HRTF on audio data on the first object, performs processing using the common HRTF on audio data on the second object, and outputs a sound corresponding to channel-base data generated by performing the processing on the audio data on the first object and a sound corresponding to channel-base data generated by performing the processing on the audio data on the second object.

(6)

The reproducing device according to (3), further including a transmission data acquisition unit configured to acquire the transmission data to be reproduced from a plurality of pieces of the transmission data that is prepared for the transmission source device and varies in the number of first objects.

(7)

A reproducing method that causes a reproducing device to reproduce object audio contents including a first object reproduced by using a personalized HRTF that is an HRTF personalized for a listener, and a second object reproduced by using a common HRTF that is an HRTF shared among a plurality of listeners.

(8)

A program that causes a computer to perform processing of reproducing object audio contents including a first object reproduced by using a personalized HRTF that is an HRTF personalized for a listener, and a second object reproduced by using a common HRTF that is an HRTF shared among a plurality of listeners.

(9)

An information processing device including: a metadata generation unit configured to generate metadata including a flag indicating whether an object is to be reproduced as a first object reproduced by using a personalized HRTF that is an HRTF personalized for a listener or a second object reproduced by using a common HRTF that is an HRTF shared among a plurality of listeners, and
a content generation unit configured to generate object audio contents including sound source data on a plurality of objects and the metadata.

(10)

The information processing device according to (9), wherein the metadata generation unit generates the metadata further including layout information on the layout of speakers when the common HRTF is measured.

(11)

The information processing device according to (9) or (10), wherein the metadata generation unit generates the metadata including, as the flag, information on the importance of localization of a sound image for each object.

(12)

The information processing device according to (11), wherein the importance is set on the basis of at least one of an object type, a distance from a listening position to the position of the object, the direction of the object at the listening position, and the height of the object.

(13)

An information processing method that causes an information processing device to:
generate metadata including a flag indicating whether an object is to be reproduced as a first object reproduced by using a personalized HRTF that is an HRTF personalized for a listener or a second object reproduced by using a common HRTF that is an HRTF shared among a plurality of listeners; and generate object audio contents including sound source data on a plurality of objects and the metadata.

(14)

A program that causes a computer to perform processing of generating metadata including a flag indicating whether an object is to be reproduced as a first object reproduced by using a personalized HRTF that is an HRTF personalized for a listener or a second object reproduced by using a common HRTF that is an HRTF shared among a plurality of listeners, and generating object audio contents including sound source data on a plurality of objects and the metadata.

(15)

An information processing device including:
a content acquisition unit configured to acquire object audio contents including sound source data on a plurality of objects and metadata including a flag indicating whether the object is to be reproduced as a first object reproduced by using a personalized HRTF that is an HRTF personalized for a listener or a second object reproduced by using a common HRTF that is an HRTF shared among a plurality of listeners;
an audio processing unit configured to perform processing using the common HRTF on audio data on the object selected to be reproduced as the second object on the basis of the flag; and
a transmission data generation unit configured to generate transmission data on the contents including channel-base data generated by the processing using the common HRTF and audio data on the first object.

(16)

The information processing device according to (15), wherein the transmission data generation unit generates, for each of the contents, a plurality of pieces of the transmission data varying in the number of first objects.

(17)

An information processing method that causes an information processing device to:
acquire object audio contents including sound source data on a plurality of objects and metadata including a flag indicating whether the object is to be reproduced as a first object reproduced by using a personalized HRTF that is an HRTF personalized for a listener or a second object reproduced by using a common HRTF that is an HRTF shared among a plurality of listeners; perform processing using the common HRTF on audio data on the object selected to be reproduced as the second object on the basis of the flag; and
generate transmission data on the contents including channel-base data generated by the processing using the common HRTF and audio data on the first object.

(18)

A program that causes a computer to perform processing of
acquiring object audio contents including sound source data on a plurality of objects and metadata including a flag indicating whether the object is to be reproduced as a first object reproduced by using a personalized HRTF that is an HRTF personalized for a listener or a second object reproduced by using a common HRTF that is an HRTF shared among a plurality of listeners;
performing processing using the common HRTF on audio data on the object selected to be reproduced as the second object on the basis of the flag; and
generating transmission data on the contents including channel-base data generated by the processing using the common HRTF and audio data on the first object.

REFERENCE SIGNS LIST

1 Content production device
2 Content management device
11 Reproducing device
12 Headphones
121 Content generation unit
122 Object sound-source data generation unit
123 Metadata generation unit
131 Position information generation unit
132 Localization-importance information generation unit 133 Personalized layout information generation unit
151 Content/common HRTF acquisition unit
152 Object audio processing unit
153 2-ch mixing unit
154 Transmission data generation unit
155 Transmission data storage unit
156 Transmission unit
161 Rendering unit
162 Binaural processing unit
221 Content processing unit
222 Localization improving unit
223 Object audio processing unit
231 Data acquisition unit
232 Content storage unit
233 Reception setting unit
241 Localization-improvement coefficient acquisition unit
242 Localization-improvement coefficient storage unit
243 Personalized HRTF acquisition unit
244 Personalized HRTF storage unit
251 Object audio processing unit
252 2-ch mixing unit
261 Rendering unit
262 Localization improving unit
263 Binaural processing unit

The invention claimed is:

1. A reproducing device comprising a reproducing unit configured to reproduce object audio contents including a first object reproduced by using a personalized HRTF that is an HRTF personalized for a listener, and a second object reproduced by using a common HRTF that is an HRTF shared among a plurality of listeners, wherein the reproducing unit performs processing using the personalized HRTF on audio data on the first object, performs processing using the common HRTF on audio data on the second object, and outputs a sound corresponding to channel-base data generated by performing the processing on the audio data on the first object and a sound corresponding to channel-base data generated by performing the processing on the audio data on the second object.

2. The reproducing device according to claim 1, further comprising an HRTF acquisition unit configured to acquire the personalized HRTF on a basis of an image of a listener's ear and layout information on a layout of speakers when the common HRTF is measured, the layout information being included in the contents.

3. The reproducing device according to claim 1, wherein transmission data on the contents includes audio data on the first object and channel-base data generated in a transmission source device of the contents by performing processing using the common HRTF on audio data on the second object.

4. The reproducing device according to claim 3, wherein the reproducing unit outputs a sound corresponding to channel-base data generated by performing processing using the personalized HRTF on audio data on the first object and the channel-base data included in the transmission data.

5. The reproducing device according to claim 3, further comprising a transmission data acquisition unit configured to acquire the transmission data to be reproduced from a plurality of pieces of the transmission data that is prepared for the transmission source device and varies in the number of first objects.

6. A reproducing method that causes a reproducing device to reproduce object audio contents including a first object reproduced by using a personalized HRTF that is an HRTF personalized for a listener, and a second object reproduced by using a common HRTF that is an HRTF shared among a plurality of listeners, wherein the reproduction of object audio contents performs processing using the personalized HRTF on audio data on the first object, performs processing using the common HRTF on audio data on the second object, and outputs a sound corresponding to channel-base data generated by performing the processing on the audio data on the first object and a sound corresponding to channel-base data generated by performing the processing on the audio data on the second object.

7. A non-transitory computer readable medium storing instructions that, when executed by a computer, cause the computer to execute the processes of:
reproducing object audio contents including a first object reproduced by using a personalized HRTF that is an HRTF personalized for a listener, and a second object reproduced by using a common HRTF that is an HRTF shared among a plurality of listeners, wherein the reproduction of object audio contents performs processing using the personalized HRTF on audio data on the first object, performs processing using the common HRTF on audio data on the second object, and outputs a sound corresponding to channel-base data generated by performing the processing on the audio data on the first object and a sound corresponding to channel-base data generated by performing the processing on the audio data on the second object.

8. An information processing device comprising: a metadata generation unit configured to generate metadata including a flag indicating whether an object is to be reproduced as a first object reproduced by using a personalized HRTF that is an HRTF personalized for a listener or a second object reproduced by using a common HRTF that is an HRTF shared among a plurality of listeners; and a content generation unit configured to generate object audio contents including sound source data on a plurality of objects and the metadata.

9. The information processing device according to claim 8, wherein the metadata generation unit generates the metadata further including layout information on a layout of speakers when the common HRTF is measured.

10. The information processing device according to claim 8, wherein the metadata generation unit generates the metadata including, as the flag, information on importance of localization of a sound image for each object.

11. The information processing device according to claim 10, wherein the importance is set on a basis of at least one of an object type, a distance from a listening position to a position of the object, a direction of the object at the listening position, and a height of the object.

12. An information processing method that causes an information processing device to:
generate metadata including a flag indicating whether an object is to be reproduced as a first object reproduced by using a personalized HRTF that is an HRTF personalized for a listener or a second object reproduced by using a common HRTF that is an HRTF shared among a plurality of listeners;
and generate object audio contents including sound source data on a plurality of objects and the metadata.

13. A non-transitory computer readable medium storing instructions that, when executed by a computer, cause the computer to execute the processes of:
generating metadata including a flag indicating whether an object is to be reproduced as a first object reproduced by using a personalized HRTF that is an HRTF personalized for a listener or a second object reproduced by using a common HRTF that is an HRTF shared among a plurality of listeners, and generating object audio contents including sound source data on a plurality of objects and the metadata.

14. An information processing device comprising:
a content acquisition unit configured to acquire object audio contents including sound source data on a plurality of objects and metadata including a flag indicating whether the object is to be reproduced as a first object reproduced by using a personalized HRTF that is an HRTF personalized for a listener or a second object reproduced by using a common HRTF that is an HRTF shared among a plurality of listeners; an audio processing unit configured to perform processing using the common HRTF on audio data on the object selected to be reproduced as the second object on a basis of the flag; and a transmission data generation unit configured to generate transmission data on the contents including channel-base data generated by the processing using the common HRTF and audio data on the first object.

15. The information processing device according to claim 14, wherein the transmission data generation unit generates, for each of the contents, a plurality of pieces of the transmission data varying in the number of first objects.

16. An information processing method that causes an information processing device to:
acquire object audio contents including sound source data on a plurality of objects and metadata including a flag indicating whether the object is to be reproduced as a first object reproduced by using a personalized HRTF that is an HRTF personalized for a listener or a second object reproduced by using a common HRTF that is an HRTF shared among a plurality of listeners;
perform processing using the common HRTF on audio data on the object selected to be reproduced as the second object on a basis of the flag; and generate transmission data on the contents including channel-base data generated by the processing using the common HRTF and audio data on the first object.

17. A non-transitory computer readable medium storing instructions that, when executed by a computer, cause the computer to execute the processes of:
acquiring object audio contents including sound source data on a plurality of objects and metadata including a flag indicating whether the object is to be reproduced as a first object reproduced by using a personalized HRTF that is an HRTF personalized for a listener or a second object reproduced by using a common HRTF that is an HRTF shared among a plurality of listeners;
performing processing using the common HRTF on audio data on the object selected to be reproduced as the second object on a basis of the flag; and
generating transmission data on the contents including channel-base data generated by the processing using the common HRTF and audio data on the first object.

* * * * *